(12) United States Patent
Morimoto

(10) Patent No.: US 10,841,132 B2
(45) Date of Patent: Nov. 17, 2020

(54) DATA DIODE DEVICE WITH SPECIFIC PACKET RELAY FUNCTION, AND METHOD FOR SPECIFYING SAME

(71) Applicant: Control System Laboratory, Ltd., Kanagawa (JP)

(72) Inventor: Kenichi Morimoto, Kanagawa (JP)

(73) Assignee: Control System Laboratory LTD., Kanagawa (JP)

(*) Notice: Subject to any disclaimer, the term of this patent is extended or adjusted under 35 U.S.C. 154(b) by 34 days.

(21) Appl. No.: 16/068,046

(22) PCT Filed: Jan. 4, 2017

(86) PCT No.: PCT/JP2017/000060
§ 371 (c)(1),
(2) Date: Jan. 15, 2020

(87) PCT Pub. No.: WO2017/119418
PCT Pub. Date: Jul. 13, 2017

(65) Prior Publication Data
US 2020/0244487 A1    Jul. 30, 2020

(30) Foreign Application Priority Data

Jan. 8, 2016  (JP) ................................ 2016-002660
Jun. 3, 2016  (JP) ................................ 2016-112232

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/4625* (2013.01); *H04L 12/4633* (2013.01);
(Continued)

(58) Field of Classification Search
CPC . H04L 63/0209; H04L 63/02; H04L 63/0227; H04L 63/20; H04L 63/18;
(Continued)

(56) References Cited

U.S. PATENT DOCUMENTS 7,675,867 B1 * 3/2010 Mraz ..................... H04L 63/123
                                                          370/254
10,554,558 B2 * 2/2020 Ishii ........................ H04L 47/25
(Continued)

FOREIGN PATENT DOCUMENTS

EP          0818007 A4      6/2001
EP          0818007 B1      5/2006
(Continued)

OTHER PUBLICATIONS

Extended European Search Report dated Jun. 21, 2019 for EP17735955.1.

*Primary Examiner* — Wutchung Chu
(74) *Attorney, Agent, or Firm* — Fox Rothschild LLP; Robert J. Sacco; Carol E. Thorstad-Forsyth

(57) ABSTRACT

A data diode device with specific packet relay function (14) is connected between an external network and an internal network. The data diode device with specific packet relay function (14) includes a first unit (21) and a second unit (22) connected by a signal line (Q), and the first unit (21) connected with the external network (15) has a first reference table (T1) in which a plurality of pieces of packet registration information are registered to correspond to the signal lines (Q). The second unit (22) connected with the internal network (16) has a second reference table (T2) content of which is the same as the first reference table (T1). By activating the signal line corresponding to the packet registration information including a source IP address, a destination IP address and application data which are included in a packet received by the first unit (21), the
(Continued)

content of the packet and that the packet to be transmitted to the internal network (16) is received are conveyed to the second unit (22). The second unit (22) generates the packet based on the packet registration information to deliver to the second network. The data diode device with specific packet relay function (14) relays the packet from the internal computer (12) to the external computer (11) by use of a unidirectional transmission path S for transmitting data in one direction.

8 Claims, 13 Drawing Sheets

(51) Int. Cl.
  *H04L 12/741* (2013.01)
  *H04L 29/12* (2006.01)
(52) U.S. Cl.
  CPC .......... *H04L 12/4641* (2013.01); *H04L 45/74* (2013.01); *H04L 61/103* (2013.01)
(58) Field of Classification Search
  CPC ..... H04L 63/105; H04L 63/10; H04L 63/123; H04L 63/1408; H04L 63/0236; H04L 63/1425; H04L 63/126; H04L 63/14; H04L 69/16; H04L 63/0457; H04L 63/101; H04L 45/74; H04L 63/029; H04L 12/66; H04L 12/4641; H04L 61/103; H04L 12/4625; H04L 12/4633; G06F 21/606; G06F 21/57; G06F 2221/2113; G06F 21/56; G06F 21/00; H04W 12/06
  See application file for complete search history.

(56) References Cited

U.S. PATENT DOCUMENTS

| | | | |
|---|---|---|---|
| 2002/0112181 A1 | 8/2002 | Smith | |
| 2010/0257353 A1* | 10/2010 | Cheng | H04L 63/105 713/153 |
| 2010/0290476 A1* | 11/2010 | Brindle | H04L 63/0209 370/401 |
| 2011/0153969 A1* | 6/2011 | Petrick | G06F 21/606 711/163 |
| 2012/0131189 A1* | 5/2012 | Smart | G06F 21/64 709/225 |
| 2013/0117556 A1 | 5/2013 | Coleman et al. | |
| 2013/0254878 A1* | 9/2013 | Clarke | H04L 63/1425 726/22 |
| 2014/0052989 A1* | 2/2014 | Jones | G06F 21/85 713/171 |
| 2015/0163198 A1* | 6/2015 | Moore | H04L 63/029 726/14 |
| 2017/0048259 A1* | 2/2017 | Dodge | H04L 63/168 |
| 2017/0054687 A1* | 2/2017 | Ishigaki | H04L 63/0227 |
| 2017/0118123 A1* | 4/2017 | Ishii | H04L 47/127 |
| 2018/0115517 A1* | 4/2018 | Rotvold | H04L 63/061 |
| 2019/0197002 A1* | 6/2019 | Dunn | G06F 21/606 |
| 2019/0272162 A1* | 9/2019 | Couillard | G06F 21/57 |
| 2020/0159181 A1* | 5/2020 | Kfir | H04L 63/123 |

FOREIGN PATENT DOCUMENTS

| | | |
|---|---|---|
| JP | H11502976 A | 3/1999 |
| JP | 2004120667 A | 4/2004 |
| JP | 2010199943 A | 9/2010 |
| JP | 2012523170 A | 9/2012 |
| JP | 2014140096 A | 7/2014 |
| JP | 2015133558 A | 7/2015 |

* cited by examiner

| PRE-CONVERSION PORT NUMBER | POST-CONVERSION PORT NUMBER |
|---|---|
| 1501 | 3001 |
| 4003 | 3002 |
| 1487 | 3003 |
| 1401 | 3004 |
| 1843 | 3005 |

DATA DIODE DEVICE WITH SPECIFIC PACKET RELAY FUNCTION, AND METHOD FOR SPECIFYING SAME

TECHNICAL FIELD

The present invention relates to a data diode device with specific packet relay function, and a method for configuring the same.

BACKGROUND ART

For example, a data collection system has been known which collects data concerning an operating condition of a plant together in a datacenter in order to monitor or maintain the operating condition and improve an operating efficiency. In such a data collection system, an information requesting side computer installed at the datacenter is connected with an information providing side computer installed at the plant via a network. The information requesting side computer sends a request to the information providing side computer via the network, the request causing the information providing side computer to acquire or transmit to the information requesting side computer data concerning the operating condition. On the other hand, the information providing side computer acquires the data in accordance with the request, and transmits the data which is stored in a packet to the information requesting side computer via the network.

In order to protect a network apparatus in the plant including the information providing side computer from unauthorized access, information leak, computer virus invasion and the like, the data collection system as described above connects a firewall at a border between a network connected with the network apparatus in the plant (hereinafter, referred to as an internal network) and an external network to ensure security for the internal network.

An apparatus physically limiting communication to one direction, which is called a data diode, has been known as an apparatus for ensuring reliable security. The data diode is installed at the border between the internal network and the external network, and authorizes data transmission only from the network apparatus in the internal network to the network apparatus in the external network. Such a data diode blocks the data transmission on a way to the internal network not by a software communication control but completely blocks on the basis of a physical principle. For example, the data diode is configured to include a light emitter and light receiver of only one direction for optical communication to completely limit to the data transmission of only one direction. In a serial communication such as Ethernet (registered trademark) or RS-232C, the reliable security may be similarly attained by blocking one direction of a bidirectional signal line.

SUMMARY OF INVENTION

Technical Problem

The data diode like this physically limits the communication to one direction, which is different from a device for controlling and blocking the communication by use of software, so that a function to limit a communication direction of the communication is not altered and an unauthorized access to the internal network is not permitted. Therefore, the security can be maintained also in a long term operation.

However, since the data diode completely blocks external communication toward the internal network, in a case of use in the data collection system as described above, contents of data transmitted from the information providing side computer connected with the internal network and a timing of its transmission are disadvantageously limited to predefined content and transmission timing. In other words, various requests from the information requesting side computer connected with the external network cannot be transmitted to the information providing side computer. For this reason, even a possible limited request cannot be given from the outside to the inside of the internal network, such as a request to temporarily stop data transmission owing to an external factor, for example, failure of equipment on the external network side, or a request to retransmit data when the data is failed to be received.

The present invention has been made in consideration of the above circumstances, and an object of the invention is to provide a data diode device with specific packet relay function which has a simple configuration and is capable of transmitting an authorized specific packet such as an external request to a network protected by a data diode while ensuring reliable security, and to provide a method for configuring the data diode device.

Solution to Problem

A data diode device with specific packet relay function according to claim 1 of the invention includes: a first unit connected with a first network; a second unit connected with a second network; a unidirectional transmission path through which a packet received from the second network is configured to be transmitted in only one direction from the second unit to the first unit; and a packet relay unit configured to relay, to the second network, only specific packets authorized among packets received from the first network. The packet relay unit includes: a signal line unit having a plurality of signal lines between the first unit and the second unit; a packet determination unit provided in the first unit and having pieces of first packet registration information preliminarily registered therein for the specific packets authorized to be relayed, the packet determination unit being configured to: determine whether or not a packet from the first network is a registered packet for which one of the pieces of first packet registration information is registered; and activate, if the packet from the first network is the registered packet, a signal line corresponding to the one of the pieces of first packet registration information for the registered packet among the plurality of signal lines; and a packet restoration unit provided in the second unit and having pieces of second packet registration information preliminarily registered therein for the specific packets authorized to be relayed, the packet restoration unit being configured to: generate, in response to one of the plurality of signal lines being activated, a restored packet equivalent to the packet received by the first unit based on one of the pieces of second packet registration information corresponding to the activated one of the plurality of signal lines; and deliver the restored packet to the second network.

A method for configuring the data diode device with specific packet relay function according to claim 7 of the invention includes: a first forming step of loading setting configuration information onto each of the first and second programmable logic devices and forming a communication wiring in each of the first and second programmable logic devices to validate a packet transmission path for sending a packet from the first network to the second network, and to form, on at least one of the first and second programmable logic devices, an information acquisition unit for acquiring, from the packet on the packet transmission path, packet registration information including source information, destination information, and application data; a transmitting step of transmitting a specific packet authorized to be relayed from the first network apparatus toward the second network apparatus; an information acquiring step of acquiring, by the information acquisition unit, the packet registration information from the packet transmitted at the transmitting step; an information registering step of registering the packet registration information acquired at the information acquiring step as first and second packet registration information in the first and second reference tables so as to correspond to one of the plurality of signal lines; and a second forming step of, after the information registering step, loading first normal configuration information onto the first programmable logic device to form at least the first control unit on the first programmable logic device, thereby configuring the first unit, and loading second normal configuration information onto the second programmable logic device to form at least the second control unit on the second programmable logic device, thereby configuring the second unit.

A data diode device with specific packet relay function according to claim 4 of the invention includes: a first unit connected with a first network; a second unit connected with a second network; a unidirectional transmission path through which a packet received from the second network is configured to be transmitted in only one direction from the second unit to the first unit; and a packet relay unit configured to relay, to the second network, only specific packets authorized among packets received from the first network. The packet relay unit includes: a signal line unit having a plurality of signal lines between the first unit and the second unit; a variable packet signal line unit having one or more variable packet signal lines between the first unit and the second unit; a packet determination unit provided in the first unit and having, as pieces of first packet registration information preliminarily registered therein for each of the specific packets, partial main packets excluding variable packets in the specific packets, the packet determination unit being configured to: determine whether or not a packet from the first network is a registered packet for which one of the pieces of first packet registration information is registered; and activate, if the packet from the first network is the registered packet, a signal line corresponding to the one of the pieces of first packet registration information for the registered packet among the plurality of signal lines; and a packet restoration unit provided in the second unit and having, as pieces of second packet registration information preliminarily registered therein for each of the specific packets, partial main packets excluding variable packets in the specific packets, the packet restoration unit being configured to: generate, in response to one of the plurality of signal lines being activated, a restored packet equivalent to the packet received by the first unit based on one of the pieces of second packet registration information corresponding to the activated one of the plurality of signal lines; and deliver the restored packet to the second network. The packet determination unit: has pieces of first variable packet registration information preliminarily registered therein for each of the variable packets in each of the specific packets, each of the pieces of first variable packet registration information indicating that the one or more variable packet signal lines are active or inactive; and is configured to activate or inactivate the one or more variable packet signal lines when activating the signal line among the plurality of signal lines based on the packet, in accordance with one of the pieces of first variable packet registration information corresponding to one of the variable packets within the packet. The packet restoration unit: has pieces of second variable packet registration information preliminarily registered therein, the pieces of second variable packet registration information being equivalent to the pieces of first variable packet registration information; is configured to identify one of the pieces of second variable packet registration information depending on a state where the one or more variable packet signal lines are activated or inactivated when generating the restored packet; and is configured to deliver, to the second network, one of the variable packets corresponding to the one of the pieces of second variable packet registration information, as a restored variable packet equivalent to the one of the variable packets within the packet received by the first unit.

Advantageous Effects of Invention

According to the data diode device with specific packet relay function in claims 1 and 4 of the present invention, a packet from the second network to the first network is transmitted using the unidirectional transmission path, and the packet is relayed from the first network to the second network in such a way that when a packet which is registered as the first packet registration information is received by the first unit side, a signal line corresponding to the first packet registration information is activated, a restored packet equivalent to the packet received by the first unit is generated from the second packet registration information corresponding to the activated signal line, and the restored packet is delivered to the second network. This makes it possible, in the present invention, to send only an authorized specific packet externally coming to the network apparatus in the protected second network by use of a simple configuration, and ensure reliable security without the second unit being modified by the first network side.

According to the method for configuring the data diode device with specific packet relay function in claim 7 of the present invention, the packet registration information is acquired from the packet flowing through the packet transmission path which is validated by loading the setting configuration information onto the first and second programmable logic devices constituting the first and second units, and is registered in the first and second reference tables. This makes it possible, in the present invention, to, by transmitting via the packet transmission path the packets authorized to be relayed, create the first and second reference tables in which registered is the packet registration information corresponding to those packets, and to easily configure the data diode device with specific packet relay function depending on the connected system.

In claim 4 of the present invention, on the basis of the variable packet signal line activated or inactivated by the first unit, the corresponding second variable packet registration information is identified in the second unit to generate the restored variable packet equivalent to the variable packet in the packet received by the first unit from the relevant second variable packet registration information. In the present invention, this disables directly transmitting of the packet from the first unit side to the second unit side, which ensures reliable security without the second unit being modified by the first network side. Further, the variable packet can also be sent to the second network separately from the main packet, through which variable packet various pieces of data can be transmitted from the first network to the second network.

DESCRIPTION OF EMBODIMENTS

First Embodiment

Figure 1:
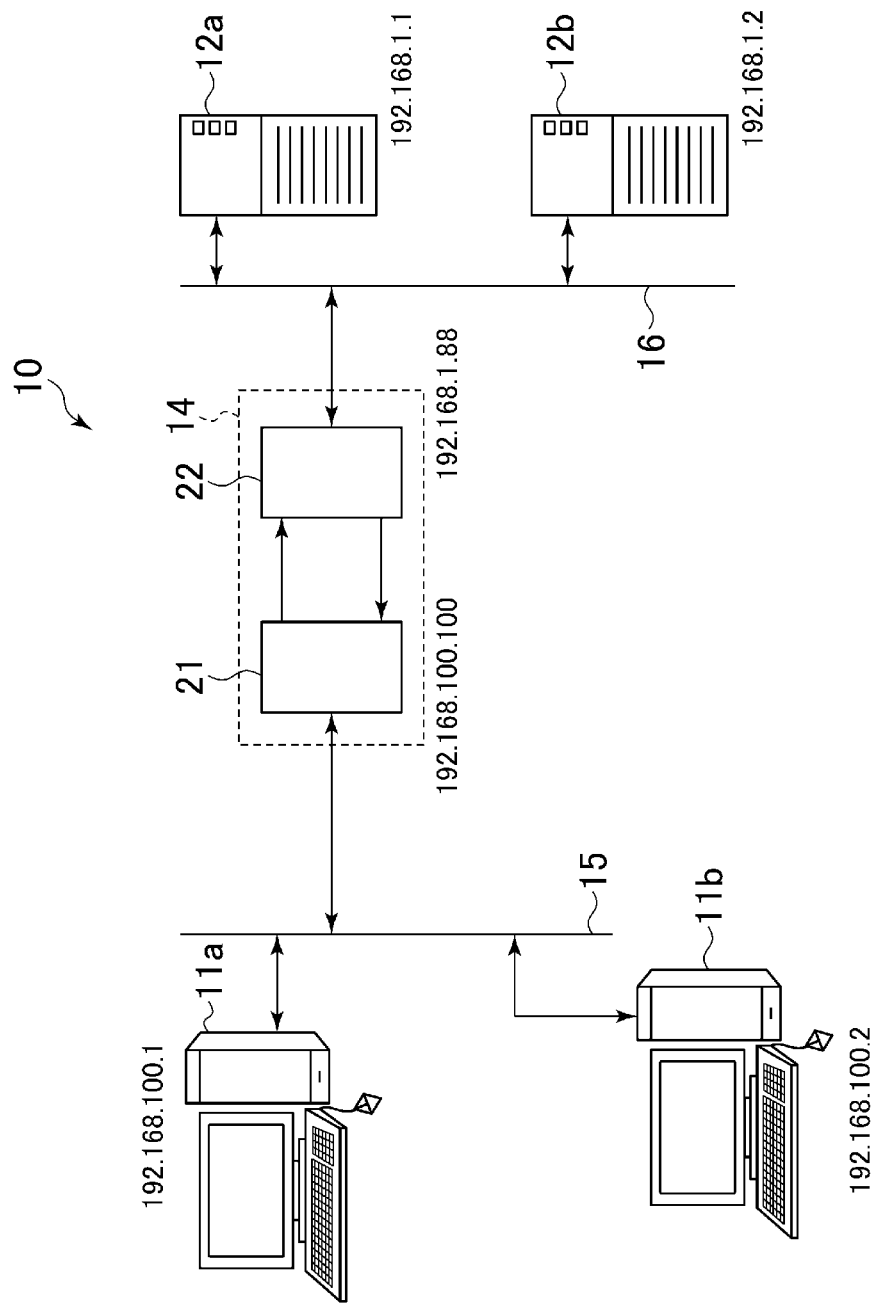
FIG. 1 is a schematic diagram of a data collection system implementing the present invention.

As illustrated in FIG. 1, a data collection system 10 implementing the present invention is a system in which first and second external computers 11a and 11b collect data from first and second internal computers 12a and 12b via a data diode device with specific packet relay function (hereinafter, simply referred to as a data diode device) 14. For example, the first and second internal computers 12a and 12b are provided in a plant, and the external computer 11 is provided out of the plant. The first and second internal computers 12a and 12b acquire various pieces of process data such as temperatures and pressures measured by sensors provided in the plant, which process data the external computer 11 acquires from the first and second internal computers 12a and 12b. The data acquired from the internal computer 12 is not limited to the process data. In the following description, when the first and second external computers 11a and 11b do not need to be specifically distinguished, they are collectively called the external computer 11. When the first and second internal computers 12a and 12b do not need to be specifically distinguished, they are collectively called the internal computer 12.

An external network 15 as a first network is provided with a plurality of first network apparatuses including the external computer 11. An internal network 16 as a second network is provided with second network apparatuses including the internal computer 12. The data diode device 14 is connected with a border between the external network 15 and the internal network 16. The data diode device 14 transmits packets from the internal network 16 to the external network 15, and relays only a preauthorized specific packet from the external network 15 to the internal network 16. The internal network 16 is a network protected by the data diode device 14 against an external unauthorized access.

In this example, the external computer 11 and the data diode device 14 as well as the internal computer 12 and the data diode device 14 communicate with each other using a TCP/IP, that is, an internet protocol suite. The data collection system 10 uses, for example, Ethernet (registered trademark) in a network interface layer of a four hierarchical model of the TCP/IP (corresponding to the first and second layers of an OSI reference model). For the purpose of brief description, in this example, assume that the packet relayed by the data diode device 14 is a packet in which the TCP is used as a protocol in a transport layer. A communication protocol is not specifically limited.

The external computer 11 transmits and receives the packet to and from the internal computer 12 via the external network 15, the data diode device 14, and the internal network 16. By doing so, the external computer 11 acquires the process data from the internal computer 12. As is well known, the packet is a PDU (Protocol Data Unit) which is generated in such a way that application data is generated by processing in an application layer (the fifth to seventh layers of the OSI reference model), to which a header (a TCP header in this example) is added in a transport layer (corresponding to the fourth layer of the OSI reference model) to generate a segment, to which a header (an IP header in this example) is further added in an internet layer (corresponding to the third layer of the OSI reference model). Actually, a frame in which an Ethernet header is added to the packet is transmitted and received.

In a case where the external computer 11 acquires the process data from the internal computer 12, it delivers a packet storing therein a request message described later as the application data to the external network 15. The data diode device 14 is interposed between the external computer 11 and the internal computer 12, where the external computer 11 assigns an IP address of the internal computer 12 to a destination IP address of the packet. If the request message is stored in the packet received by the internal computer 12, the internal computer 12 reads out the process data specified by the request message, and delivers a packet storing therein the read process data to the internal network 16. The external computer 11 extracts the application data such as the process data stored in the received packet.

In the following description, in a case where the packet storing therein the request message is specifically distinguished from other packets, the former packet is referred to as a request packet. In a case where the packet storing therein the process data sent back in response to the request packet is specifically distinguished from other packets, the former packet is referred to as a response packet.

The data diode device 14 includes a first unit 21 connected with the external network 15 and a second unit 22 connected with the internal network 16. The first unit 21 receives the packet transmitted from the external network 15 toward the internal network 16, and determines whether or not the received packet is a packet in which first packet registration information described later is registered (hereinafter, referred to as a registered packet). If the received packet is a registered packet, the first unit 21 activates any one of signal lines Q1, Q2 ... Qn (see FIG. 2, and if the signal lines Q1, Q2 ... Qn do not need to be specifically distinguished, they are collectively called the signal line Q) corresponding to the first packet registration information in the registered packet. The second unit 22 identifies contents of the registered packet received by the first unit 21 on the basis of second packet registration information described later corresponding to the activated signal line Q, and generates a packet (restored packet) corresponding to the received registered packet to deliver the generated packet to the internal network 16.

The data diode device 14 receives the packet from the internal network 16 by the second unit 22 and sends out the received packet to the first unit 21 via a unidirectional transmission path S (see FIG. 2), and the first unit 21 delivers the packet to the external network 15. This allows the process data addressed from the internal computer 12 to the external computer 11 to be transmitted to the external computer 11. The packet relayed to the internal network 16 by the data diode device 14 is not limited to the request packet for acquiring the process data. In the following description, however, the data diode device 14 has some request packets preliminarily registered therein as the packets to be relayed.

Figure 2:
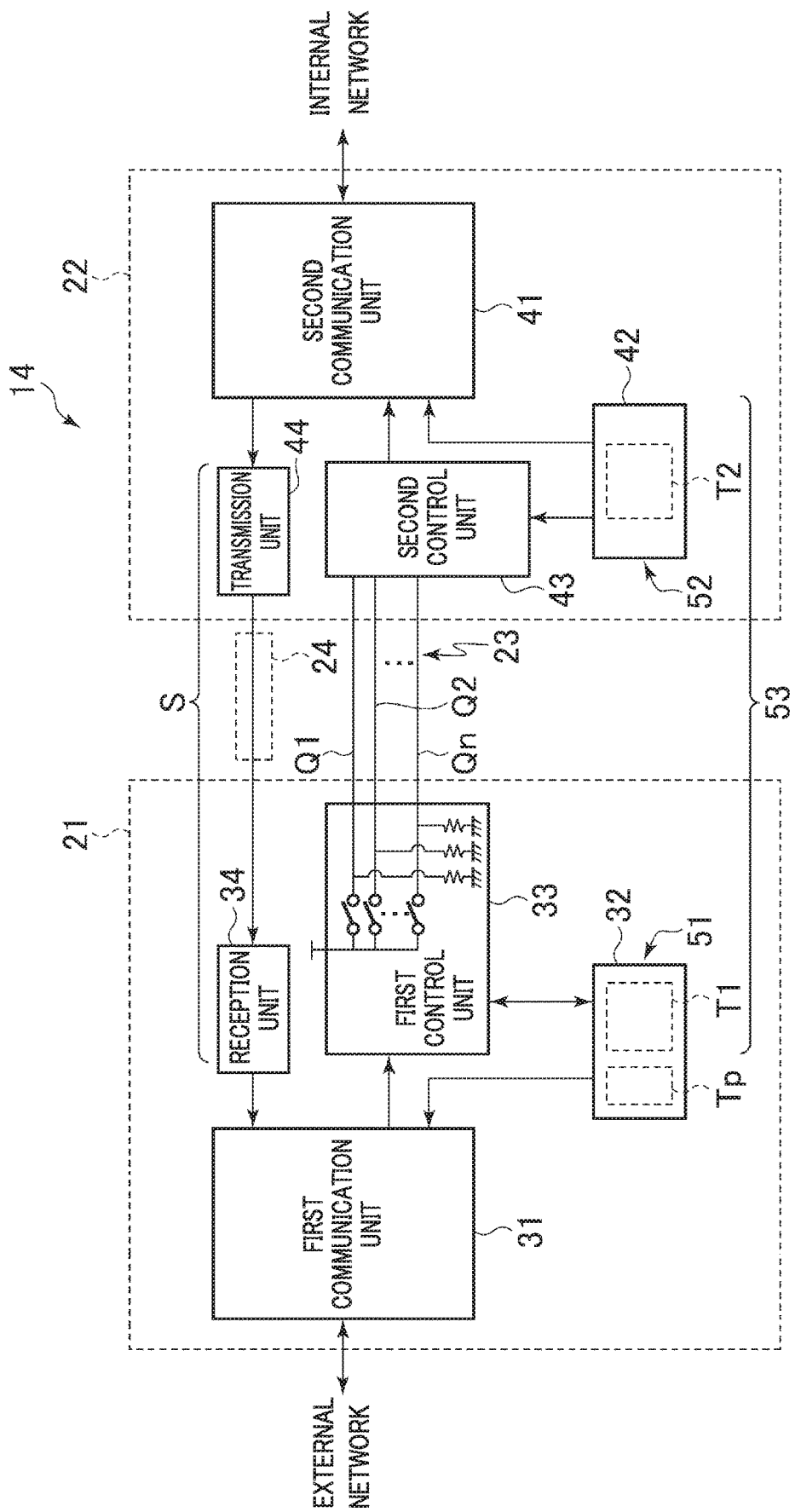
FIG. 2 is a block diagram illustrating a configuration of a data diode device with specific packet relay function.

In FIG. 2, the data diode device 14 includes the first and second units 21 and 22, a signal line unit 23 constituted by a plurality of signal lines Q, and a transmission line path 24 provided between the first unit 21 and the second unit 22. The first unit 21 includes a first communication unit 31, a first storage unit 32, a first control unit 33, and a reception unit 34. The second unit 22 includes a second communication unit 41, a second storage unit 42, a second control unit 43, and a transmission unit 44.

The first control unit 33 provided to the first unit 21 and a first reference table T1 stored in the first storage unit 32 constitute a packet determination unit 51. The second control unit 43 provided to the second unit 22 and a second reference table T2 stored in the second storage unit 42 constitute a packet restoration unit 52. The packet determination unit 51, the packet restoration unit 52, and the signal line unit 23 constitute a packet relay unit 53. The transmission line path 24, the reception unit 34 in the first unit 21, and the transmission unit 44 in the second unit 22 constitute the unidirectional transmission path S.

The first communication unit 31 in the first unit 21 is connected with the external network 15. This first communication unit 31 receives the packet addressed to the internal network. In this example, the first communication unit 31 receives a packet assigned the destination IP address of the first packet registration information registered in the first reference table T1 among the packets from the external network 15. A network address of the internal network 16 may be preset in the first communication unit 31, for example, so that a packet whose network address part of the destination IP address matches the network address may be received.

The first communication unit 31 extracts, from the received packet, a source IP address, the destination IP address, and the application data (hereinafter, they are collectively referred to as reception packet information), and a source port number to transmit to the first control unit 33. The first communication unit 31 delivers the packet received from the reception unit 34 constituting the unidirectional transmission path S to the external network 15. This allows the response packet to be transmitted to the external computer 11 which is a source of the request packet corresponding to the response packet.

Figure 3:
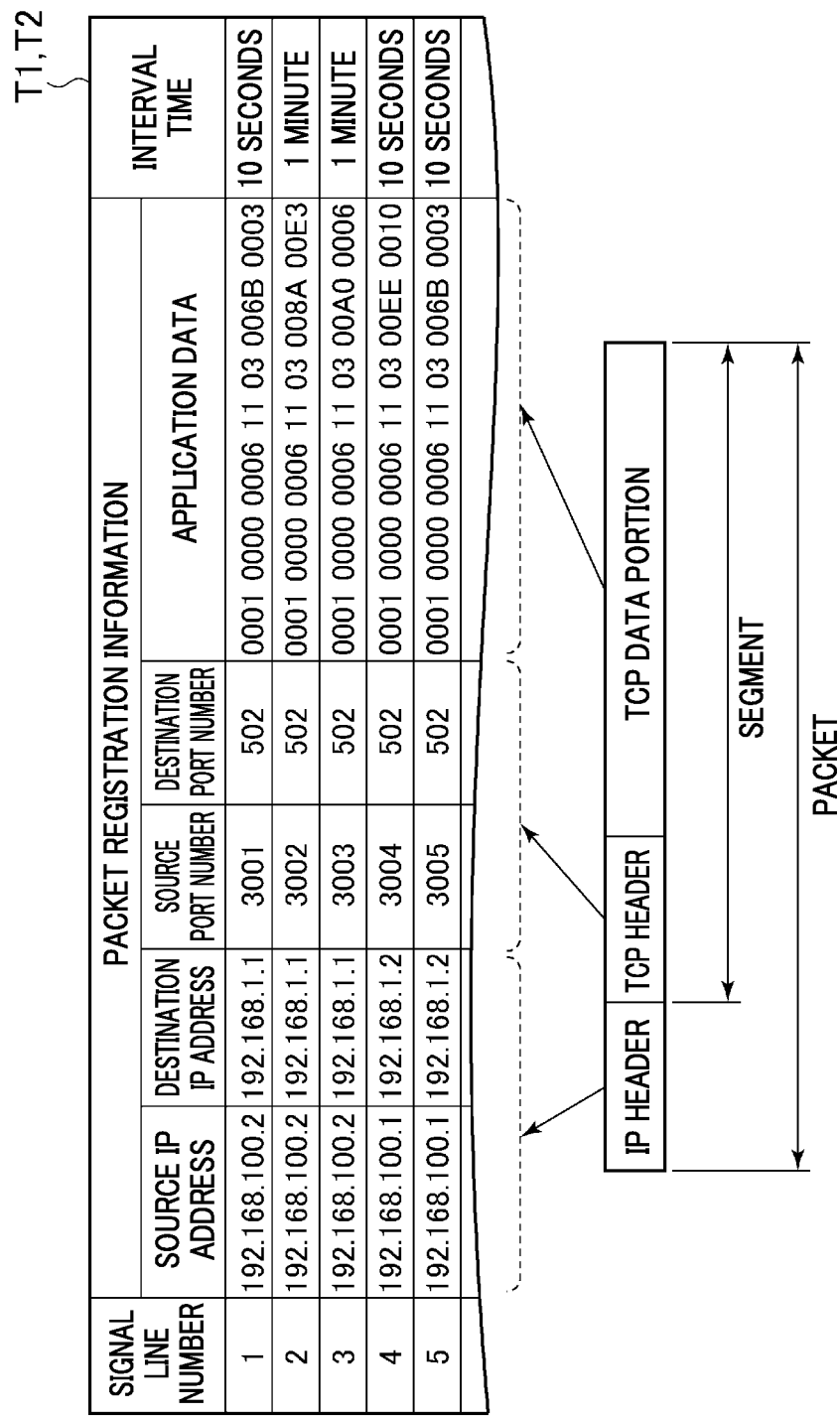
FIG. 3 is an illustration of an example of contents of each reference table.

The first storage unit 32 stores the above first reference table T1 and a port number conversion table Tp. In the first reference table T1, as illustrated in FIG. 3, registered are a plurality of records for specific packets authorized to be relayed, each record including the first packet registration information, a signal line number indicating one signal line Q corresponding to this first packet registration information, and an interval time. The signal line number and the first packet registration information in each record correspond one-to-one. The first packet registration information in this example includes the source IP address and the destination IP address stored in the IP header in the packet, the source port number and a destination port number stored in the TCP header, and the application data stored in a TCP data portion. In this example also, the source IP address in the first packet registration information is source information, and the destination IP address is destination information. Combination of the both information and the application data is used to determine whether or not the received packet is the registered packet.

The source IP address, the destination IP address, the destination port number, and the application data registered as the first packet registration information are those of the request packet actually transmitted from the external computer 11 to the internal computer 12. In contrast to this, the source port number in the first packet registration information is preassigned a port number unique to each piece of the first packet registration information.

An Modbus/TCP is used as an application protocol in this example. For this reason, a message complying with the TCP/Modbus is registered as the application data in the first packet registration information. The TCP/Modbus message includes, as is well known, data such as a function code instructing to read and write the data (process data) out and into a register provided to the internal computer 12, and an address range for reading and writing. If the process data read out is the same, the TCP/Modbus request message is the same.

Figure 4:
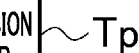
FIG. 4 is an illustration of an example of contents of a port number conversion table.

In the port number conversion table Tp, as illustrated in FIG. 4, registered by the first control unit 33 is a conversion record in which a pre-conversion port number and a post-conversion port number are associated with each other. This port number conversion table Tp is used to convert the destination port number of the response packet into the source port number of the corresponding request packet when the response packet is transmitted to the external computer 11.

In FIG. 2, the first control unit 33 determines whether or not the packet received by the first communication unit 31 as described above is the registered packet. In this determination, the first control unit 33 checks whether or not the reception packet information is included in any first packet registration information in the first reference table T1. In this determination, in the case where the reception packet information is included in any one of the pieces of the first packet registration information, that is, if all of the source IP address, the destination IP address, and the application data are included in any one of the pieces of the first packet registration information, the received packet is determined to be the registered packet. The first control unit 33 acquires the signal line number corresponding to the first packet registration information including the relevant reception packet information (hereinafter, referred to as first relevant packet registration information), and activates the signal line Q of the acquired signal line number.

The first control unit 33 registers a conversion record in the port number conversion table Tp every time the registered packet is determined. In this registration, the pre-conversion port number is set to the source port number of the registered packet, and the post-conversion port number is set to the source port number of the first relevant packet registration information. The conversion record is deleted by the first control unit 33 after the elapse of the interval time in the first relevant packet registration information that is a basis for the post-conversion port number, for example.

The destination port number of the packet transmitted by the information requesting side external computer 11 to the information providing side internal computer 12 is generally fixed for each application of a communication partner. Therefore, in this example, if the received packet matches the application data in the first packet registration information, the destination port number is considered also to match, and the destination port number is used to determining whether or not the received packet is the registered packet. Of course, the destination port number may be used as one piece of the destination information for the determination. On the other hand, the source port number of the packet transmitted by the external computer 11 is generally assigned an arbitral port number by the external computer 11. For this reason, in this example, the source port number is not used to determine whether or not the received packet is the registered packet. Of course, if the source port number is fixed, it can be used as one piece of the source information. In this case, the above port number conversion table Tp does not need to be created.

A time when the first control unit 33 receives a new packet having the same reception packet information as the previously received packet is within the interval time in the first packet registration information corresponding to the previously received packet from a time when the first control unit 33 responds to the previously received packet to activate the signal line Q, the first control unit 33 does not activate the signal line Q for the new packet. This allows the internal computer 12 to be protected against a so-called flood attack that involves transmitting a large amount of packets in a short time. A timing start point of the interval time may be the time when receiving the previously received packet.

The number of the signal lines Q may be equal to or more than that in the first packet registration information registered in the first reference table T1. In this example, a metal line is used for the signal line Q. The first control unit 33, which has a plurality of switches connected with the respective signal lines Q, turns on a switch connected with a signal line number corresponding to the first relevant packet registration information. This activates the signal line Q corresponding to the first relevant packet registration information, or sets to a high level in this example. An active state of the signal line Q may be a low level. The signal line Q may be able to notify the second unit 22 of whether or not it is active. For example, a light-emitting diode and a light receiving element may be used for the signal line Q so that, when the line Q is activated, the first unit 21 lights the light-emitting diode and the second unit 22 detects the light-emitting diode lighting by way of the light receiving element.

The reception unit 34 receives the packet from the second unit 22 via the transmission line path 24. The reception unit 34 also converts the destination port number of the packet received from the second unit 22 with reference to the port number conversion table Tp. In other words, the reception unit 34 searches the port number conversion table Tp for the post-conversion port number having the destination port number of the received packet to replace the destination port number of the received packet with the pre-conversion port number corresponding to that post-conversion port number. This replaces the destination port number of the response packet with the source port number of the request packet corresponding to that destination port number. The reception unit 34 transmits the packet whose destination port number is replaced to the first communication unit 31.

The second control unit 43 in the second unit 22 is connected with the respective signal lines Q. In the second storage unit 42, the second reference table T2 having the same content as the first reference table T1 is written as illustrated in FIG. 3. In the second reference table T2, the packet registration information in each record is the second packet registration information, and the second packet registration information is associated with the signal lines Q (signal line numbers) having the same content as in the first packet registration information. This allows the first and second packet registration information for the same packet to be registered to correspond to the same signal line Q.

The second control unit 43, in response to any of the signal lines Q being activated, reads out from the second reference table T2 the second packet registration information associated with the signal line number of the activated signal line Q, that is, the second packet registration information having the same content as the first relevant packet registration information (hereinafter, referred to as second relevant packet registration information, in a case of being specifically distinguished from other second packet registration information), and generates the packet assigned the application data, source IP address, destination IP address, source port number, and destination port number in the second relevant packet registration information. This allows a restored packet equivalent to the packet received by the first unit 21 to be generated on the basis of the second relevant packet registration information. The packet generated by the second control unit 43 is sent to the second communication unit 41. The interval time may be omitted in the second reference table T2.

The second communication unit 41 is connected with the internal network 16. The second communication unit 41 delivers the packet generated by the second control unit 43 to the internal network 16. This sends the packet generated by the second control unit 43 to the internal computer 12. The second communication unit 41 also sends the packet received from the internal network 16 to the transmission unit 44.

In the case where the packet is generated from the second relevant packet registration information, the source port number may be replaced with an arbitral port number and the source IP address may be replaced with IP address of the second unit 22. In this case, correspondingly to this, the destination port number and destination IP address of the packet sent back by the internal computer 12 are replaced with the source port number and source port number in the second relevant packet registration information, and then, that packet is transmitted to the first unit 21.

The unidirectional transmission path S, which is constituted, as described above, by the reception unit 34 in the first unit 21, the transmission unit 44 in the second unit 22, and the transmission line path 24, is a data diode of which the communication direction is physically limited to one direction from the second unit 22 side toward the first unit 21 side. For example, the transmission unit 44 includes a modulation circuit modulating a light output from light-emitting element depending on the light-emitting element or input data, and a transmission-side circuit for error correction, and the reception unit 34 includes a demodulation circuit demodulating the data depending on the light receiving element or a received light intensity, and a receiving-side circuit for error correction. For the transmission line path 24, an optical fiber is used which couples between the light-emitting element of the transmission unit 44 and the light receiving element of the reception unit 34. In the unidirectional transmission path S, the packet from the second communication unit 41 as data to be transmitted is input to the transmission unit 44, and the input data is sent via the transmission line path 24 to the reception unit 34.

The unidirectional transmission path S may be those limited to the communication in one direction and is not limited to the above configuration, but is preferably configured to be physically limit the communication direction as described above, for example, in terms of ensuring the transmission in one direction. Preferably used as the error correction is a forward error correction scheme which does not need the data retransmission request when an error occurs.

As describe above, the packet received by the reception unit 34 is sent to the first communication unit 31 after the destination port number thereof is converted, and is delivered by the first communication unit 31 to the external network 15. This allows the response packet for the process data to be transmitted to the external computer 11 which requests that process data from the internal computer 12.

A method of transmitting the application data is not limited to the above method. For example, the application data obtained from the response packets may be temporarily accumulated in a buffer or the like, and then, collectively transmitted via the unidirectional transmission path S and the information such as the destination IP address, and the destination port number may be transmitted. In this case, on the first unit 21 side, the packet to be transmitted to the external computer 11 is reconfigured from the collectively transmitted application data and the information such as the destination IP address and the destination port number, and transmitted.

At least the application data and information from which the first unit 21 can identify a destination of the application data may be sent from the second unit 22 to the first unit 21 using the unidirectional transmission path S. For example, the application data and destination port number extracted from the packet may be transmitted. In this case, the destination IP address of the response packet may be set to the source IP address in the first packet registration information whose source port number matches the destination port number.

The first unit 21 and the second unit 22 configured as described above may perform operations of the transport layer and lower layers in order to perform the communication, with respect to the first network apparatus on the external network 15 and the second network apparatus on the internal network 16, respectively, where the operations of the transport layer and lower layers do not vary depending on the application or the connected apparatus, and therefore, a simple configuration can be achieved so long as the fixed functions are attained.

Each of the functions of the first and second units 21 and 22 constituting the data diode device 14 may be configured by use of a personal computer, for example. In this case, for example, two personal computers are provided, of which one is made to serve as the first unit 21 and the other as the second unit 22 by installing programs for realizing the functions of the first and second units 21 and 22. As the signal line Q, used is a connection between terminals of general purpose input and output ports or the like mounted on the personal computers. As the unidirectional transmission path S, used for connection is only one direction in bidirectional signal lines such as RS-232C of the personal computers.

On the other hand, the first and second units 21 and 22 may be achieved by using, for example, an ASIC (application specific integrated circuit), a programmable logic device (PLD) represented by an FPGA (Field Programmable Gate Array) as in a second embodiment described later, or the like. In the PLD, any circuit configuration is possible depending on a combination of a plurality of circuit blocks and various processing circuits can be formed, but it is difficult to change the processing circuit itself after configuring the circuit. Therefore, using the ASIC or the PLD in this way can disable function modification, such as rewrite of the contents of the first reference table T1, and can make it difficult to change operational contents of the first control unit 33. Then, this can significantly lower a risk of the unauthorized access from the external network 15 to the internal computer 12.

Next, reference will be made to effects of the above configuration using an example where the second external computer 11b is operated to acquire the process data from the first internal computer 12a. In the following description, as illustrated in FIG. 1, assume that an IP address of the first external computer 11a is "192.168.100.1", and an IP address of the second external computer 11b is "192.168.100.2". Moreover, assume that an IP address of the first internal computer 12a is "192.168.1.1", and an IP address of the second internal computer 12b is "192.168.1.2". Further, assume that the content illustrated in FIG. 3 is registered in the first reference table T1 and the second reference table T2.

First, the second external computer 11b is operated to instruct to acquire the process data from the first internal computer 12a. On the basis of this instruction, the second external computer 11b establishes a connection between the first internal computer 12a and the TCP. Therefore, the second external computer 11b first broadcasts an ARP request in which the IP address of the first internal computer 12a is stored as the destination IP address.

Figure 5:
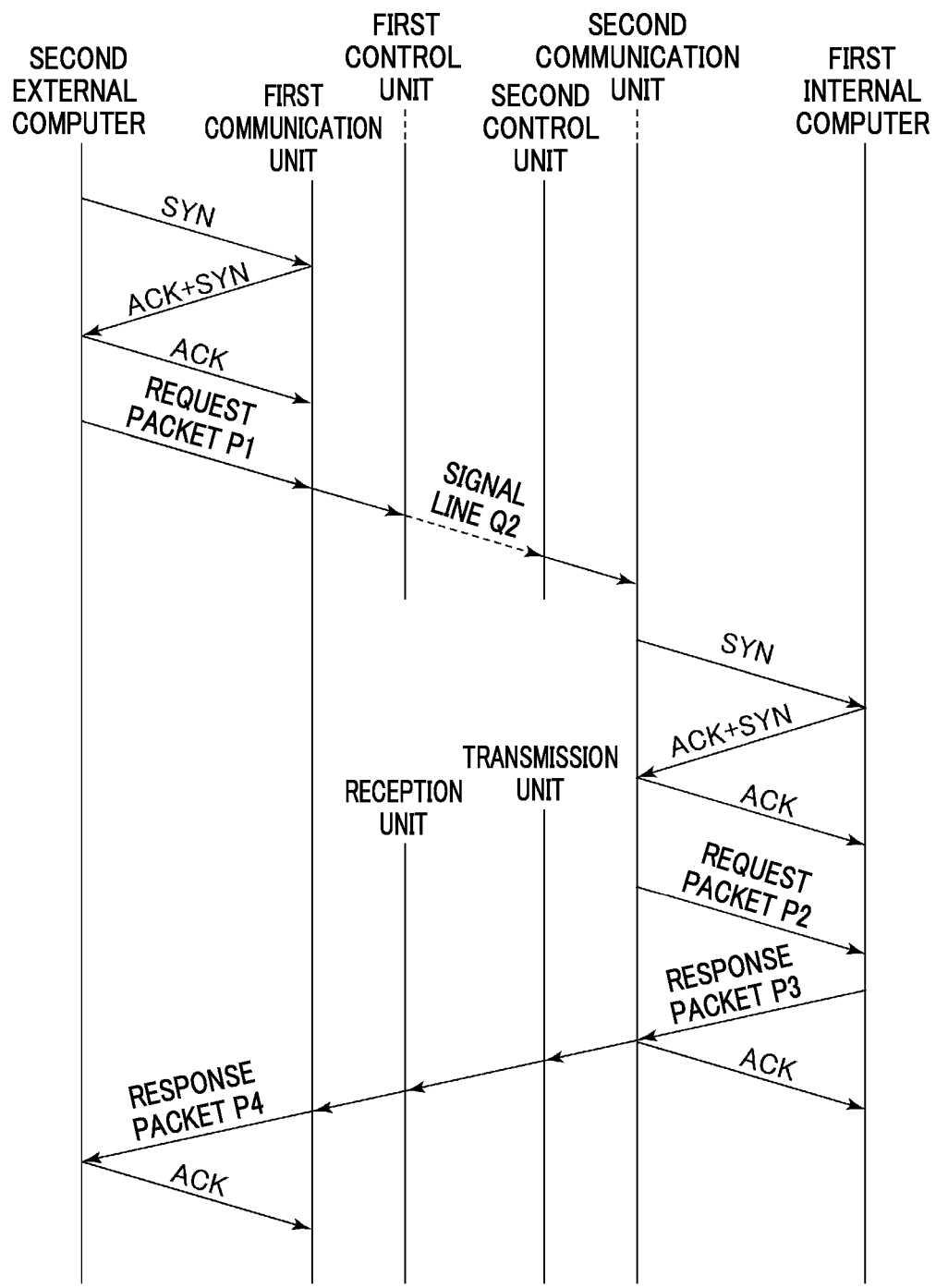
FIG. 5 is an illustration of an example of a communication sequence.

Since the first packet registration information in which the destination IP address is set to the IP address of the first internal computer 12a is registered in the first reference table T1, the first communication unit 31 in the first unit 21 sends back, in response to the above ARP request, an ARP reply storing an MAC address of the first communication unit 31 to a source of the ARP request. This allows the second external computer 11b to acquire the MAC address of the first communication unit 31 from the ARP reply. In the subsequent procedures, if the second external computer 11b delivers the packet in which the destination IP address is set to the IP address of the first internal computer 12a, it sets a destination MAC address to the MAC address of the first communication unit 31. Then, the second external computer 11b transmits an SYN packet in which a destination IP address is set to the IP address of the first internal computer 12a. As a result, as illustrated in FIG. 5, the SYN packet, an ACK+the SYN packet, and an ACK packet are transmitted and received between the second external computer 11b and the first communication unit 31 to establish the TCP connection. A source MAC address in a case where each of the external computer 11, the internal computer 12, and the first and second communication units 31 and 41 transmits the packet is a MAC address of itself.

Figure 6:
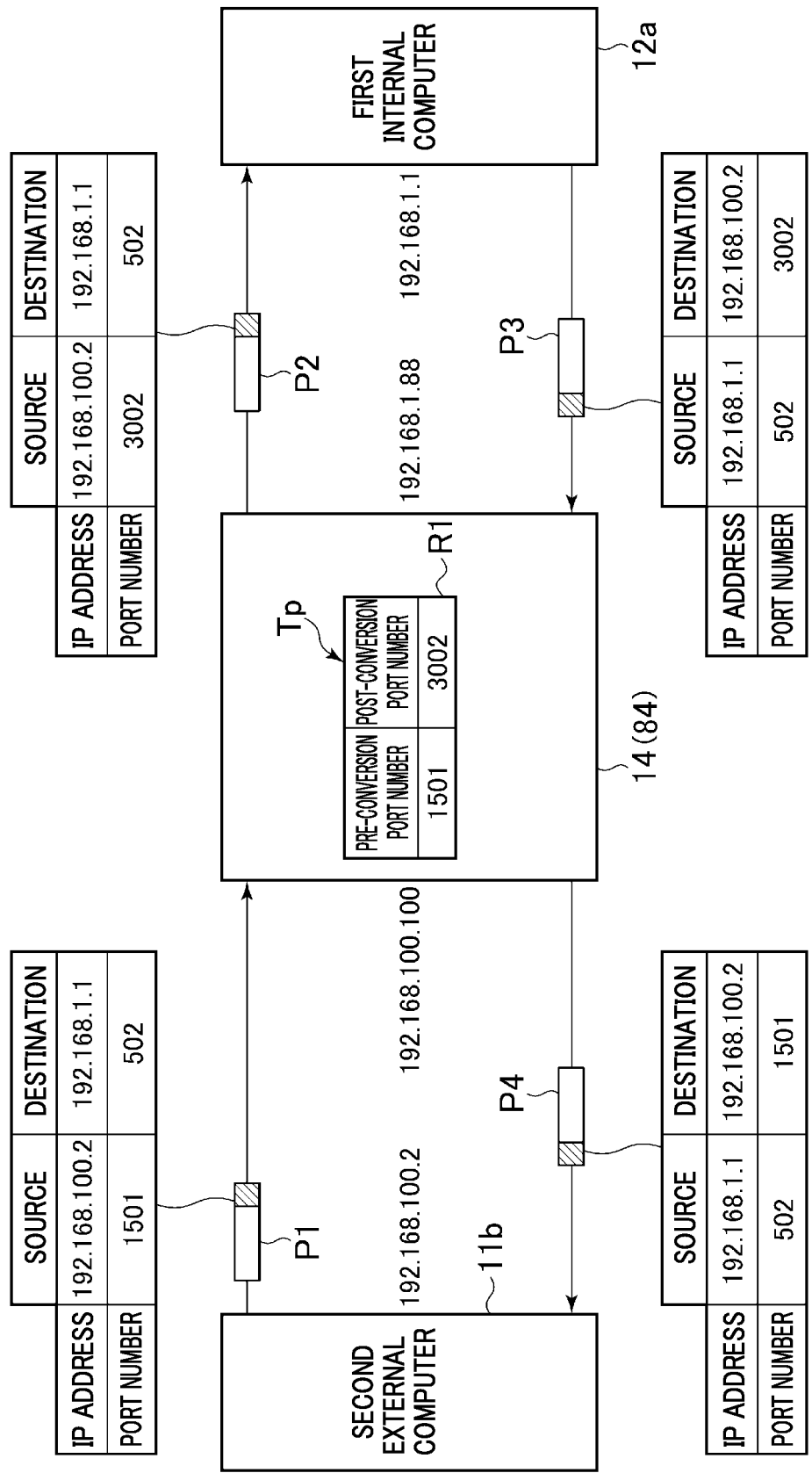
FIG. 6 is an illustration of an example of a header changing.

After establishing the TCP connection, the second external computer 11b generates a request packet P1 (see FIG. 5 and FIG. 6) in which the request message depending on the process data to be acquired is stored in the TCP data portion, and delivers the request packet P1 to the external network 15. As illustrated in FIG. 6, the source IP address assigned to the request packet P1 is the IP address "192.168.100.2" of the second external computer 11b, and the destination IP address is the IP address "192.168.1.1" of the first internal computer 12a. The request packet is assigned to the port number (502 in this example) corresponding to the TCP/Modbus as the destination port number, and assigned an arbitral port number (1501 in this example) as the source port number.

The request packet P1 is received by the first communication unit 31, and the reception packet information and source port number extracted from the request packet P1 are sent to the first control unit 33. The first control unit 33, once receiving the reception packet information and the source port number, checks whether or not the reception packet information is included in any piece of the first packet registration information registered in the first reference table T1 to determine whether or not the request packet P1 is the registered packet.

If no first packet registration information including the reception packet information is in the first reference table T1, the request packet P1 is determined to be not the registered packet. In the case of determining not to be the registered packet in this way, the first control unit 33 disconnects the connection between the first communication unit 31 and the second external computer lib, for example. On the other hand, if the first packet registration information including the reception packet information, that is, the first relevant packet registration information is in the first reference table T1, the request packet P1 is determined to be the registered packet. Then, in this case, the signal line Q corresponding to the first relevant packet registration information is activated (set to the high level) for a predetermined time period.

If the contents of the application data in the request packet P1 are, for example, "0001 0000 0006 11 03 008A 00E3", the first packet registration information corresponding to the signal line number "2" in the first reference table T1 is the first relevant packet registration information. Therefore, the first control unit 33 activates the signal line Q2 of the signal line number "2". This conveys that the first unit 21 receives the packet including the first packet registration information corresponding to the signal line number "2" by way of the signal line Q2, from the first control unit 33 to the second control unit 43, as illustrated by a broken line in FIG. 5.

The first control unit 33 also registers the conversion record corresponding to the request packet P1 in the port number conversion table Tp. As illustrated in FIG. 6, a conversion record R1 is registered in which the pre-conversion port number is set to the source port number "1501" of the request packet P1 and the post-conversion port number is set to the source port number "3002" in the first relevant packet registration information.

On the other hand, when any one signal line Q is activated as described above, the second control unit 43 identifies the signal line number of the activated signal line Q. Then, the second control unit 43 reads out from the second reference table T2 the second packet registration information corresponding to the identified signal line number, that is, the second relevant packet registration information having the same content as the first relevant packet registration information. Then, the TCP connection is established between the second communication unit 41 and a network apparatus whose IP address is the destination IP address of the second relevant packet registration information. The second communication unit 41 uses the ARP to acquire the MAC address corresponding to the destination IP address in the second relevant packet registration information, and thereafter, uses the destination IP address in the second relevant packet registration information to transmit and receive the SYN packet, the ACK+the SYN packet, and the ACK packet so as to establish the TCP connection.

Once the TCP connection is established, the second control unit 43 generates a packet having the application data of the second relevant packet registration information to which added are the TCP header having the destination port number and source port number in the second relevant packet registration information, and the IP header having the destination IP address and source IP address in the second relevant packet registration information. Then, this generated packet is delivered from the second communication unit 41 to the internal network 16.

In the case where the signal line Q2 is activated as described above, the second packet registration information corresponding to the signal line number "2" is the second relevant packet registration information. Since the destination IP address in the second relevant packet registration information is that of the first internal computer 12a the same as the request packet P1, the TCP connection is established between the second communication unit 41 and the first internal computer 12a. Moreover, since the second relevant packet registration information has the same content as the first relevant packet registration information, the second control unit 43 generates a request packet P2 (see FIG. 5 and FIG. 6) having content substantially the same as the request packet P1. In other words, the request packet P2 is the same as the request packet P1 in the source IP address, the destination IP address, the destination port number, and the request message (application data), and has the source port number of "3002" which is the source port number in the first and second relevant packet registration information.

With the simple configuration using the signal line Q in this way, the contents of the packet to be transmitted to the internal network 16 and the timing of transmitting that packet are conveyed from the first unit 21 to the second unit 22, and the packet equivalent to the packet received by the first unit 21 is restored from the second relevant packet registration information, and delivered to the internal network 16.

The request packet P2 delivered to the internal network 16 is received by the first internal computer 12a. The first internal computer 12a extracts the request message from the request packet P2 to process the extracted message using a predetermined application depending on the destination port number. This allows the process data depending on the request message to be extracted from the specified address range to generate a response packet P3 (see FIG. 5 and FIG. 6) storing that process data. The response packet P3 is delivered from the first internal computer 12a to the internal network 16. An ACK flag for an acknowledgement response to the request packet P2 is set in the response packet P3, for example, but the ACK packet may be transmitted separately from the response packet P3.

The response packet P3, in which the source and the destination are set inversely to the request packet P2, is assigned the IP address "192.168.1.1" of the first internal computer 12a as the source IP address, and assigned the IP address "192.168.100.2" of the second external computer 11b as the destination IP address, as illustrated in FIG. 6. The response packet P3 is also assigned the destination port number "502" of the request packet P2 as the source port number, and the source port number "3002" of the request packet P2 as the destination port number.

The response packet P3 delivered to the internal network 16, which has the destination MAC address set to the MAC address of the second communication unit 41, is received by the second communication unit 41. The second communication unit 41 sends back the ACK packet in response to receiving the response packet P3 and sends the response packet P3 to the transmission unit 44. This response packet P3 is sent from the transmission unit 44 via the transmission line path 24 to the reception unit 34 in the first unit 21. In a case where a plurality of response packets are sent back to one request packet, the respective response packets may be serially transmitted from the second unit 22 via the unidirectional transmission path S to the first unit 21.

When the reception unit 34 receives the response packet P3, it transmits to the first communication unit 31 a response packet P4 (see FIG. 5 and FIG. 6) which is obtained by referring to the port number conversion table Tp to convert the destination port number of the response packet P3. The response packet P3 has the destination port number "3002", and accordingly, the conversion record R1 having the post-conversion port number "3002" is referred to replace the destination port number of the response packet P3 with the pre-conversion port number "1501" of the conversion record R1. By doing so, the destination port number of the response packet P4 is converted into "1501" the same as the source port number of the request packet P1 as a derivation, as illustrated in FIG. 6.

As illustrated in FIG. 5, the response packet P4 is delivered from the first communication unit 31 to the external network 15. At this time, the first communication unit 31 corrects the information on the IP header and TCP header of the response packet P4, such as a sequence number or an acknowledgement response number, so that the response packet P4 be the packet to respond to the previous request packet P1. In a case where the application data in the response packet P4 cannot be transmitted by one packet, it may be divided into a plurality of packets to be transmitted.

The response packet P4, which has the destination IP address set to the IP address of the second external computer 11b, is received by the second external computer 11b. In response to receiving the response packet P4, the ACK packet is sent back from the second external computer 11b, and this ACK packet is received by the first communication unit 31. On the other hand, in the second external computer 11b, the process data is extracted from the received response packet P4 and passed to a requestor application depending on the destination port number. Since the destination port number of the response packet P4 is the same as the source port number assigned to the request packet P1, the process data is passed to the requestor application.

In accordance with a procedure similar to the above, if the reception packet information of the request packet sent by the external computer 11 to the internal computer 12 is the same as those in the first packet registration information preliminarily registered in the first reference table T1, a request packet equivalent to that request packet is generated by the second unit 22 and transmitted to the internal computer 12. Then, the external computer 11 receives the response packet corresponding to the request packet from the internal computer 12 via the data diode device 14.

In this way, the external computer 11 transmits the request packet at a necessary timing to be able to acquire the process data corresponding to the request packet from internal computer 12.

On the other hand, if the reception packet information of the packet received by the first communication unit 31 from the external network 15 is not included in any pieces of the first packet registration information registered in the first reference table T1, the first control unit 33 does nothing as described above, and thus, no packet is transmitted from the second unit 22 to the internal network 16 and the internal computer 12. This disables an access to the internal computer 12 from an unauthorized computer on the external network 15, an unauthorized access to the internal computer 12, and an unauthorized acquisition of the process data. Therefore, the unauthorized access cannot be made, and information leak or the like cannot occur.

Then, the data diode device 14 conveys, as described above, the contents of the packet from the external network 15 side to the internal network 16 side, that is, from the first unit 21 to the second unit 22, by activating the signal line Q depending on the content on the first unit 21 side, and identifying the second packet registration information corresponding to the signal line Q on the second unit 22 side. Moreover, the unidirectional transmission path S in which the communication direction is limited is used to transmit the packet from the second unit 22 to the first unit 21. Therefore, even if a computer on the external network 15 side attempts illegal modification to the data diode device 14, the second unit 22 is difficult to operate and an unauthorized packet cannot be sent to the internal computer 12. Therefore, the unauthorized access to the internal computer 12 is reliably prevented.

Second Embodiment

A data diode device according to a second embodiment (data diode device with specific packet relay function) configures first and second units using an FPGA, as an example of a programmable logic device, which is capable of making any circuit configuration by combining a plurality of internal circuit blocks in accordance with configuration information, and has a normal mode for relaying a specific packet and a setting mode for acquiring the packet registration information to create a reference table. The second embodiment except for the following detailed description is similar to the first embodiment, and the members substantially the same as those in the first embodiment are designated by the same reference signs and the detailed description thereof is omitted.

Figure 7:
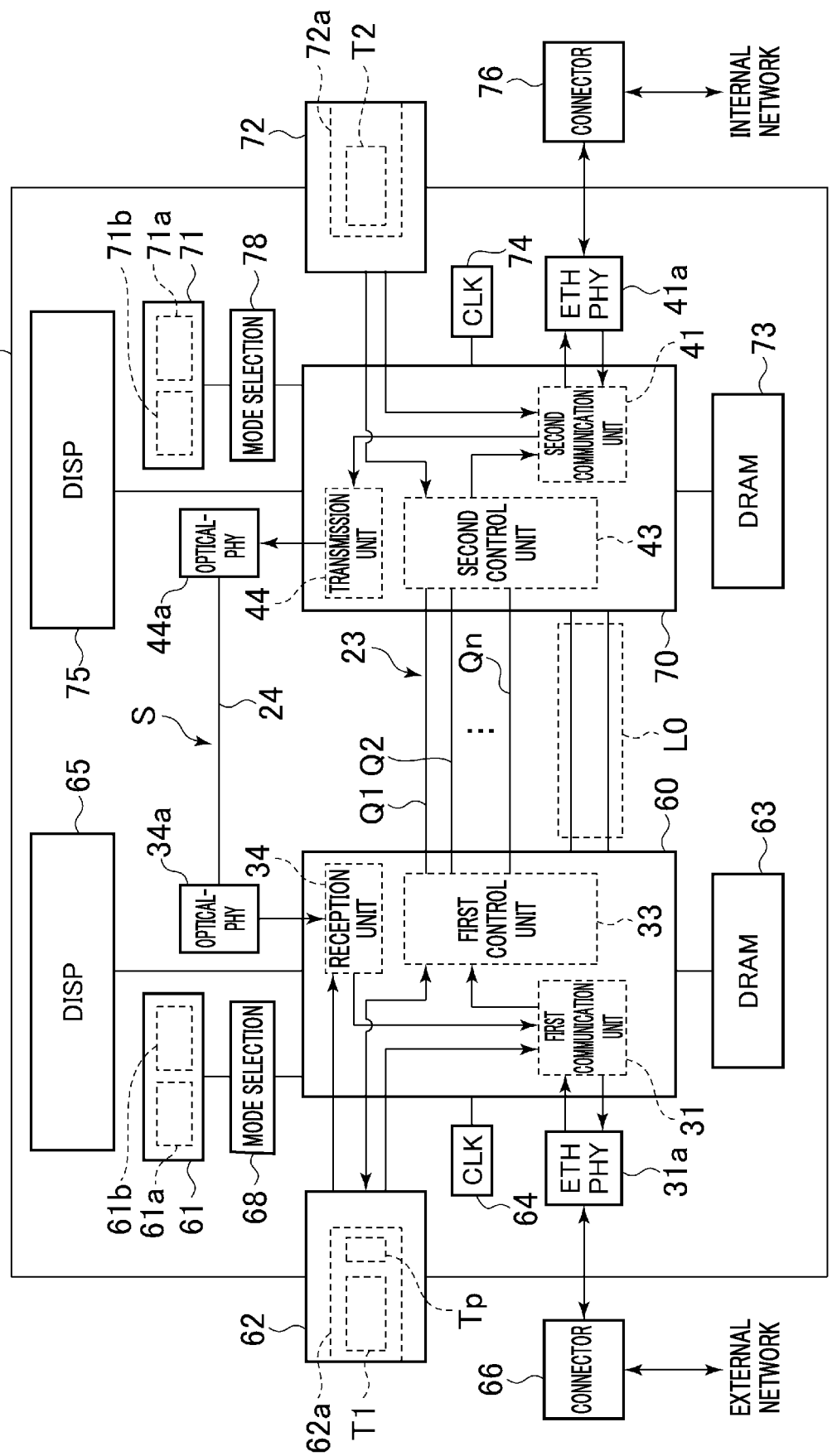
FIG. 7 is an illustration of a circuit configuration formed on an FPGA in a normal mode.

As illustrated in FIG. 7, the data diode device 14 includes first and second FPGAs 60 and 70. Each of the first and second FPGAs 60 and 70 configures, as is well known, a processing circuit having various functions by combining a plurality of internal circuit blocks in accordance with configuration information. The data diode device 14 has a setting mode and a normal mode as operational modes, and is capable of selecting the operational mode. The first and second FPGAs 60 and 70 load the configuration information of the selected operational mode every time the data diode device 14 is booted. FIG. 7 illustrates circuits formed on the first and second FPGAs 60 and 70 in the normal mode.

The first and second FPGAs 60 and 70 are mounted on a printed substrate PS at a predetermined interval. A plurality of signal lines Q and a communication wiring L0 used in the setting mode are formed between the first FPGA 60 and the second FPGA 70 on the printed substrate PS. The communication wiring L0 includes a plurality of wiring patterns linking the first FPGA 60 with the second FPGA 70. A cable detachable to the printed substrate PS may be used for the communication wiring L0, and the cable may be attached only in the setting mode.

Around the first and second FPGAs 60 and 70 on the printed substrate PS, arranged are configuration memories 61 and 71, ETH-PHY (Ethernet (registered trademark) Physical Layer) chips 31a and 41a, optical-PHY chips 34a and 44a, memory card mounting units 62 and 72, DRAMs 63 and 73, clock generators 64 and 74, and displays 65 and 75, respectively. The ETH-PHY chip 31a constitutes a part of the first communication unit 31 and is connected to the external network 15 via a connector 66. The ETH-PHY chip 41a also constitutes a part of the second communication unit 41, and is connected to the internal network 16 via a connector 76.

The memory card mounting units 62 and 72 respectively include memory slots into which memory cards 62a and 72a are inserted, interface circuits for reading and writing data to the memory cards 62a and 72a, and the like. The memory card 62a serves as the first storage unit storing the first reference table T1 and the port number conversion table Tp, and the memory card 72a serves as the second storage unit storing the second reference table T2. The optical-PHY chip 34a constitutes a part of the reception unit 34, and the optical-PHY chip 44a constitutes a part of the transmission unit 44. An optical fiber is coupled as the transmission line path 24 between the optical-PHY chips 34a and 44a.

The DRAMs 63 and 73 are used as a buffer memory transitorily storing the packet or the like. The clock generators 64 and 74 supply clock signals for operation to the first FPGAs 60 and 70. The displays 65 and 75 display operation information of the corresponding first and second units 21 and 22.

In the configuration memory 61 connected with the first FPGA 60, written are normal configuration information 61a and setting configuration information 61b for the first FPGA 60. A mode selection unit 68 for selecting the operational mode is connected between the first FPGA 60 and the configuration memory 61. By operating this mode selection unit 68, either the normal mode or the setting mode can be selected. The mode selection unit 68 switches a region of the configuration memory 61 read out by the first FPGA 60 depending on the selected operational mode to make the first FPGA 60 load the configuration information of the selected operational mode. This allows the first FPGA 60 to be loaded with the normal configuration information 61a when the normal mode is selected, and with the setting configuration information 61b when the setting mode is selected.

In the configuration memory 71 connected with the second FPGA 70, written are normal configuration information 71a and setting configuration information 71b for the second FPGA 70. A mode selection unit 78 is connected between the second FPGA 70 and the configuration memory 71. This mode selection unit 78 working in conjunction with the mode selection unit 68 selects the same operational mode as the mode selection unit 68. This allows the second FPGA 70 to be loaded with the normal configuration information 71a when the normal mode is selected, and the second FPGA 70 to be loaded with the setting configuration information 71b when the setting mode is selected.

The first FPGA 60, loaded with the normal configuration information 61a, forms therein, as illustrated in FIG. 7, the first communication unit 31, the first control unit 33, and the reception unit 34, and this first FPGA 60 and the surrounding circuits constitute the first unit 21. The second FPGA 70, loaded with the normal configuration information 71a, forms therein the second communication unit 41, the second control unit 43, and the transmission unit 44, and this second FPGA 70 and the surrounding circuits constitute the second unit 22. The configurations and operations in this normal mode of the first and second units 21 and 22 and data diode device 14 configured using the first and second FPGAs 60 and 70 are the same as in the first embodiment, the description of which is omitted.

The memory cards 62a and 72a serve as the first and second storage unit here, but may be formed within the first and second FPGAs 60 and 70. In this case, the first and second reference tables T1 and T2 preferably are made to be able to mutually replicated or moved between the memory cards 62a and 72a and the first and second storage unit such that the contents of the first and second reference tables T1 and T2 are editable using a computer or the like.

The setting mode is the operational mode for creating the first and second reference tables T1 and T2. Hereinafter, the creation of the first and second reference tables T1 and T2 using the setting mode will be described. The data diode device 14 is put in a state of being connected with the external network 15 and the internal network 16. In a case where the network addresses of the external computer 11 and the internal computer 12 are different from each other, for example, a router is connected between the data diode device 14 and the internal network 16, but a relay unit 81 described later may be made to serve as the router. Further, the memory card mounting unit 62 is put in a state where the memory card 62a is inserted.

A setting computer equivalent to the external computer 11 or the internal computer 12 may be connected with the connector 66 or 76. In this case, assigning the same IP address as the external computer 11 or the internal computer 12 to the setting computer can eliminates correcting the source IP address and the destination IP address in the first and second reference tables T1 and T2. Using the setting computer is preferable because it can prevent the unauthorized access to the internal computer 12 in the setting mode.

Figure 8:
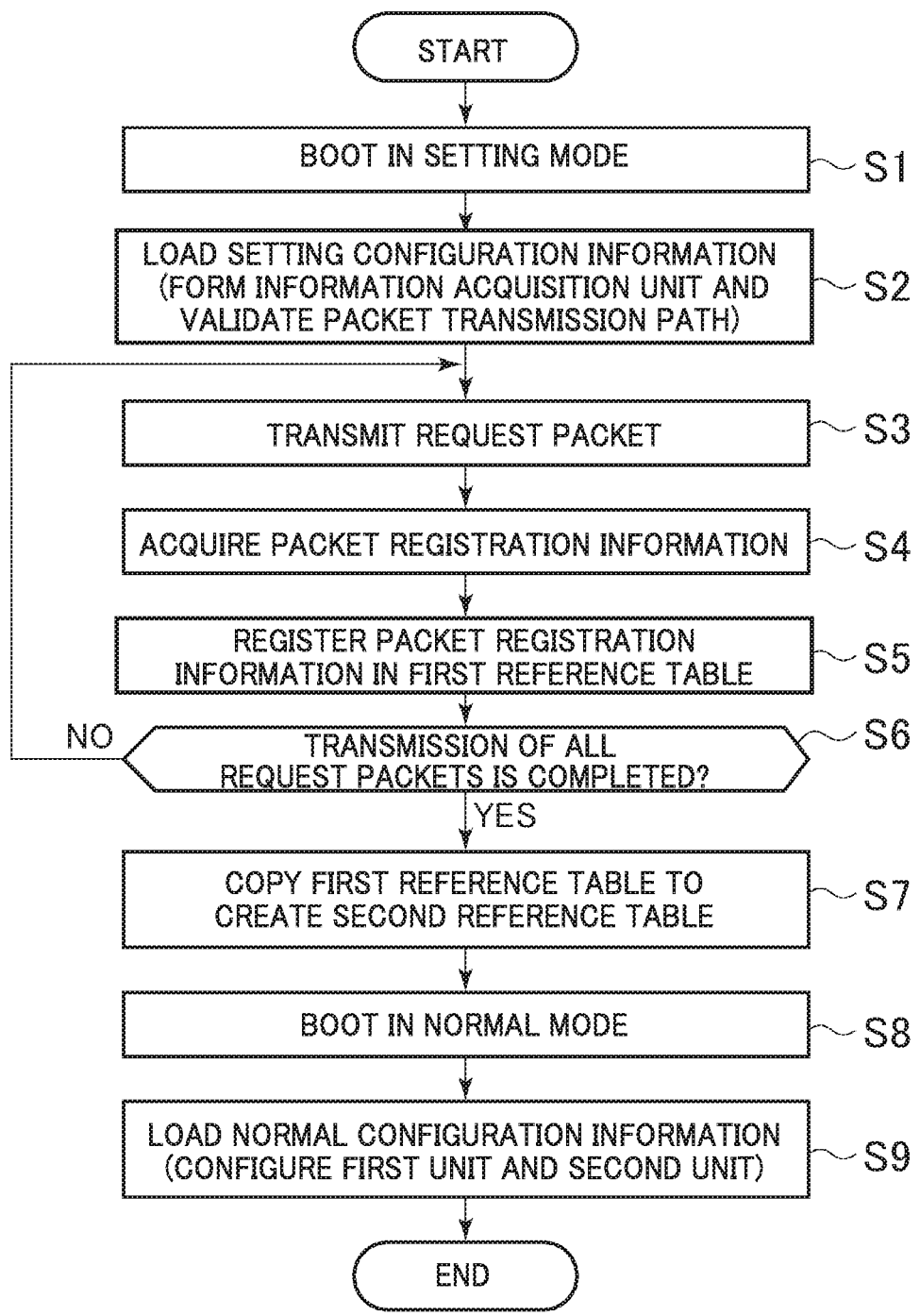
FIG. 8 is a flowchart illustrating a procedure from a setting mode to an operation in the normal mode.

As illustrated in FIG. 8, the setting mode is selected by operating the mode selection unit 68 to boot the data diode device 14 in the setting mode (step S1). In conjunction with the mode selection unit 68 being switched to the setting mode, the setting mode is also selected in the mode selection unit 78. Accordingly, the first and second FPGAs 60 and 70 respectively load the setting configuration information 61b and 71b from the corresponding configuration memories 61 and 71 (step S2).

Figure 9:
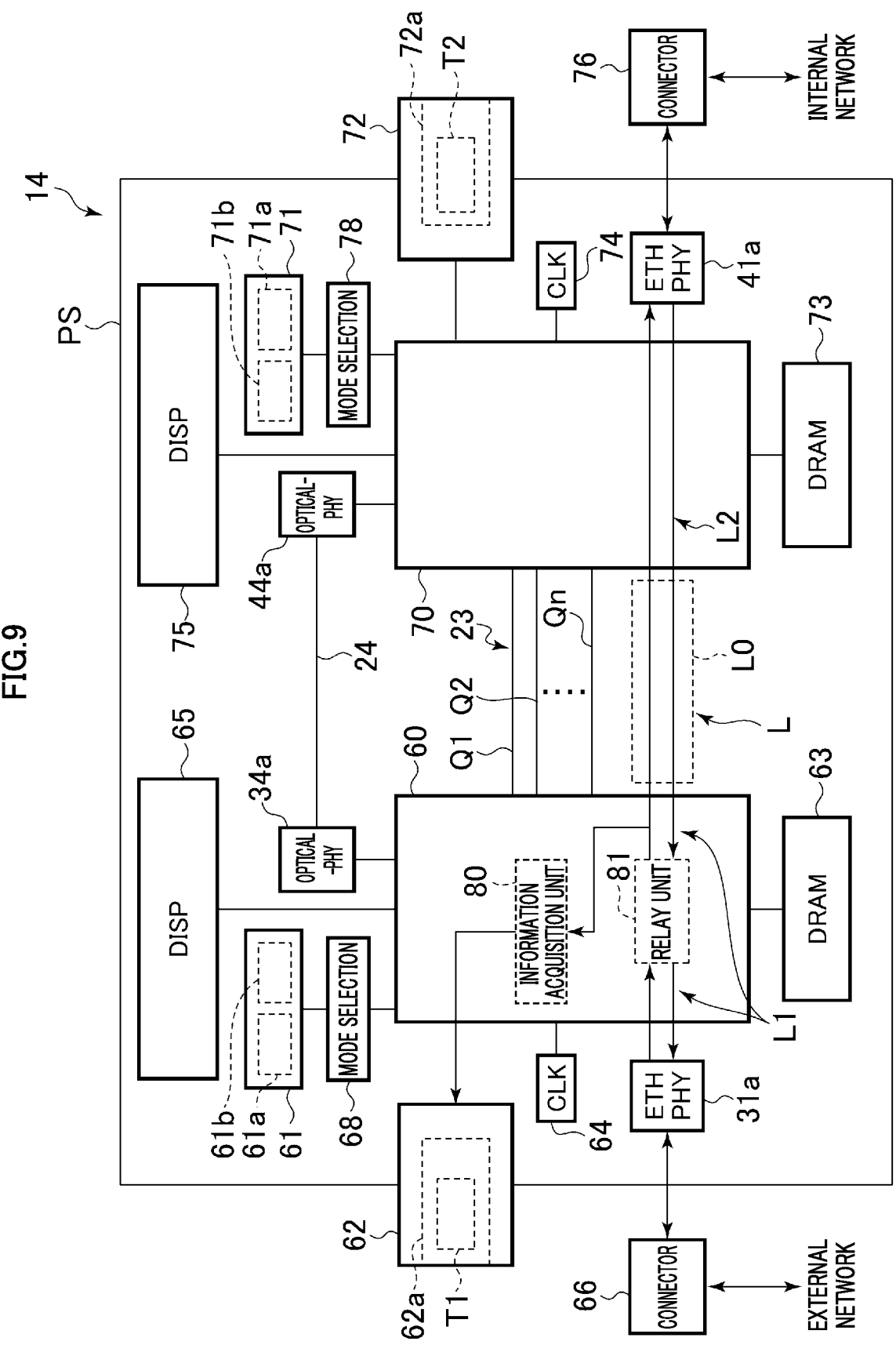
FIG. 9 is an illustration of a circuit configuration formed on an FPGA in the setting mode.

The first FPGA 60, loaded with the setting configuration information 61b and 71b, forms therein, as illustrated in FIG. 9, an information acquisition unit 80, a relay unit 81, and an internal communication wiring L1 connecting the ETH-PHY chip 31a to the communication wiring L0 via the relay unit 81. The second FPGA 70 forms therein an internal communication wiring L2 connecting the communication wiring L0 to the ETH-PHY chip 41a. The relay unit 81 relays the packet received by one of the ETH-PHY chip 31a and the ETH-PHY chip 41a to the other. This forms a packet transmission path L capable of transmitting the packet between the connector 66 and the connector 76. In other words, the packet transmission path L for transmitting the packet from the external network 15 side to the internal network 16 side is validated. The packet transmission path L is bidirectional which can transmit also the packet from the internal network 16 side to the external network 15 side, but the unidirectional transmission path S (see FIG. 7) may be formed even in the setting mode and the unidirectional transmission path S may be used to transmit the packet from the internal network 16 side to the external network 15 side.

The information acquisition unit 80, which is connected with a communication line, in the packet transmission path L, transmitting the packet from the ETH-PHY chip 31a toward the ETH-PHY chip 41a, captures the packet transmitted from the external network 15 toward the internal network 16. This information acquisition unit 80 extracts a packet satisfying an extraction condition from the captured packets, acquires from the extracted packet the source IP address, the destination IP address, the destination port number, and the application data which are the packet registration information, to which are assigned the destination port number and the interval time, and writes the obtained data associated with the signal line number in the memory card 62*a* to create the first reference table T1. The extraction condition that the application data is stored in the TCP data portion is set in the information acquisition unit 80, for example.

After completion of invoking the data diode device 14 in the setting mode, the external computer 11 is operated in order to acquire the process data, and the request packet is transmitted from the external computer 11 to the internal computer 12 (step S3). A combination of the external computer 11 operated at this time, the process data to be acquired, and the internal computer 12 from which the process data is to be acquired is a combination for which a relay is authorized. By doing this operation, the request packet is sent from the external computer 11 to the internal computer 12 via the packet transmission path L including the relay unit 81, where the request packet includes the combination relaying the destination IP address, the source IP address, and the request message, and is assigned the destination port number to be actually used.

When the internal computer 12 receives the above request packet, it sends the response packet storing the process data to the external computer 11 that is the source of the request packet. The response packet is sent to the external computer 11 via an inverse path to the request packet and received. In this way, the packet is transmitted and received between the external computer 11 and the internal computer 12. When the packet is transmitted and received between the external computer 11 and the internal computer 12, the packet for establishing the ARP or the connection, or the like is transmitted and received, for example.

Among the packets transmitted and received between the external computer 11 and the internal computer 12 as above, the packet sent from the external network 15 side to the internal network 16 side is captured by the information acquisition unit 80. Then, the information acquisition unit 80 extracts a packet satisfying the above extraction condition from the captured packets, and acquires from the extracted packet the source IP address, the destination IP address, the destination port number, and the application data which are the packet registration information (step S4). This eliminates an ARP packet, the SYN packet not storing the application data or the ACK packet, acquiring as the packet registration information the source IP address, destination IP address, destination port number and application data of the request packet storing the request message. The packet registration information may be acquired from the packet other than the request packet in some cases, but such first packet registration information may be manually removed in confirmation of the contents of the first reference table T1 after creating the first reference table T1.

The packet registration information for registration in which the source port number unique to the acquired packet registration information and the interval time are added is generated by the information acquisition unit 80, and that packet registration information associated with the signal line number is written in the memory card 62*a*. This allows the first packet registration information associated with the signal line number to be registered in the first reference table T1 (step S5).

If the transmission of all the request packets for which the first packet registration information is to be registered is not completed (NO at step S6), the operation for acquiring the process data is performed again on the external computer 11 to transmit the request packet to the internal computer 12 (step S3). In this way, the transmission of the request packet is repeated to sequentially register the packet registration information obtained by the similar procedure in the first reference table T1 (steps S4 and S5).

If the transmission of all the request packets is completed (YES at step S6), the data diode device 14 is temporarily stopped, and then, the memory card 62*a* ejected from the memory card mounting unit 62 and the memory card 72*a* are set in a data copying device (not shown) to copy the data in the first reference table T1 to the memory card 72*a*. This creates the second reference table T2 in the memory card 72*a* (step S7). After that, the memory cards 62*a* and 72*a* are inserted into the memory card mounting units 62 and 72, respectively. The data copying device may be a personal computer or the like, for example. The contents of the first reference table T1 created by the information acquisition unit 80 may be manually edited.

After the memory cards 62*a* and 72*a* are inserted, the normal mode is selected by operating the mode selection unit 68 (step S8). By doing this operation, the mode selection unit 78 is put in a state of selecting the normal mode. After that, the data diode device 14 is booted again. Since the normal mode is selected, the first and second FPGAs 60 and 70 respectively load the normal configuration information (step S9). The first FPGA 60, loaded with the normal configuration information, forms therein the first communication unit 31, the first control unit 33, and the reception unit 34, and this first FPGA 60 and the surrounding circuits constitute the first unit 21. The second FPGA 70 forms therein the second communication unit 41, the second control unit 43, and the transmission unit 44, and the second FPGA 70 and the surrounding circuits constitute the second unit 22. In the subsequent procedures, the data diode device 14 operates in the normal mode.

The first and second reference tables T1 and T2 have to be created depending on the difference of the request message or the difference of the IP address. However, by using the setting mode as described above, each record in the first and second reference tables T1 and T2 is easy to create, and setting of the data diode device 14 depending on the connected system is facilitated.

The above extraction condition is not limited thereto, and various conditions may be set. For example, the destination port number, the destination IP address, the source IP address or the like may be used as the extraction condition. A plurality of conditions may be combined to be used as the extraction condition. The first reference table T1 may be created by forming the information acquisition unit 80 in the second FPGA 70 to create the second reference table T2, and then, copying the second reference table T2 to the memory card 62*a*. The information acquisition unit 80 may be formed on both the first and second FPGAs 60 and 70 to create the first and second reference tables T1 and T2 in the corresponding memory cards, respectively.

Third Embodiment

Figure 10:
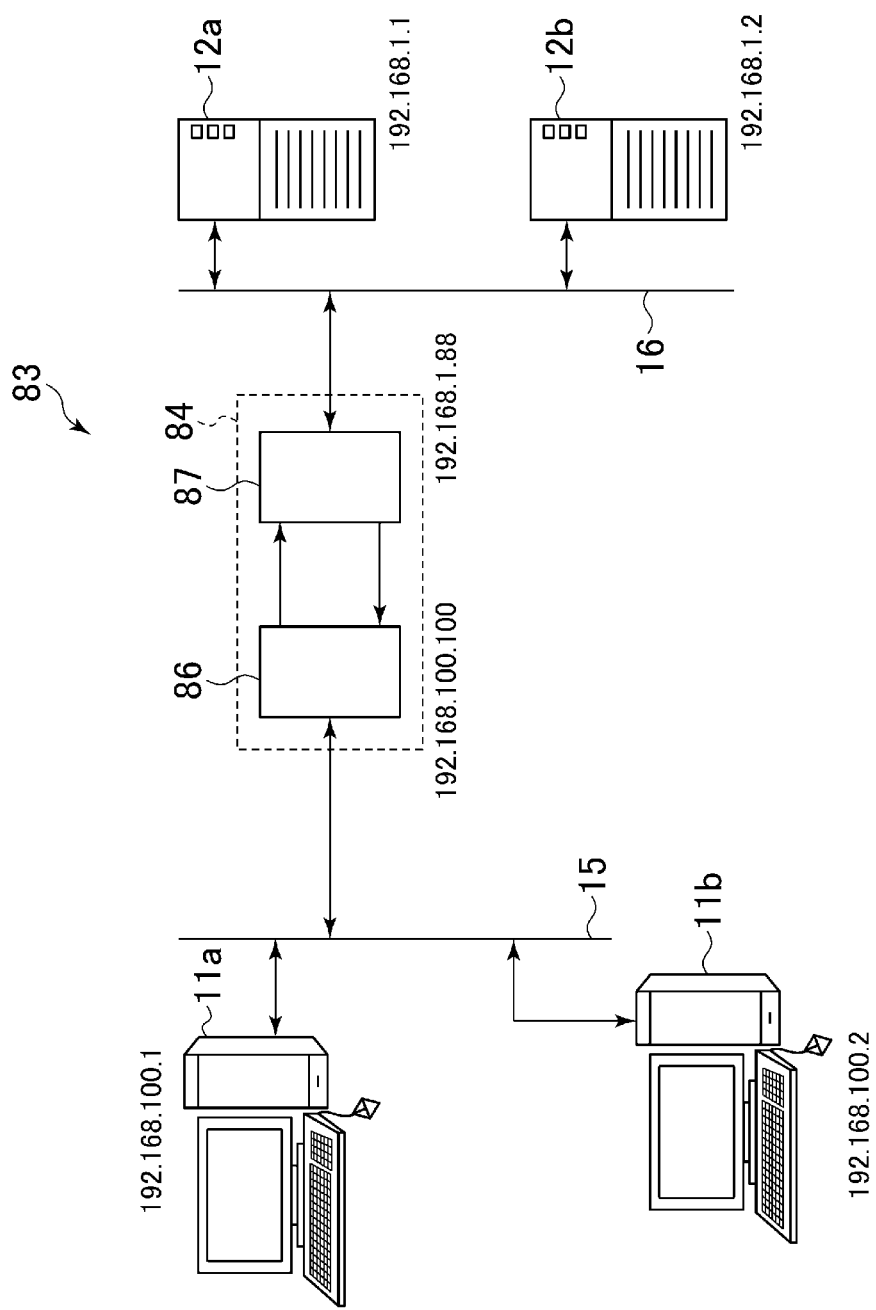
FIG. 10 is an illustration of an outline of a data collection system implementing the present invention.

As is illustrated in FIG. 10 where the components corresponding to those in FIG. 1 are designated by the same reference signs, a data collection system 83 implementing the present invention is a system in which the first and second external computers 11*a* and 11*b* (external computer 11) collect data from the first and second internal computers 12*a* and 12*b* (internal computer 12) via a data diode device with specific packet relay function (data diode device) 84. For example, the first and second internal computers 12*a* and 12*b* are provided in a plant, and the external computer 11 is provided out of the plant. The first and second internal computers 12*a* and 12*b* acquire various pieces of process data such as temperatures and pressures measured by sensors provided in the plant, or videos within the plant shot by imaging means such as a camera, which process data the external computer 11 acquires from the first and second internal computers 12*a* and 12*b*.

The external network 15 as the first network is provided with a plurality of first network apparatuses including the external computer 11. The internal network 16 as the second network is provided with second network apparatuses including the internal computer 12. The data diode device 84 is connected with a border between the external network 15 and the internal network 16. The data diode device 84 transmits packets from the internal network 16 to the external network 15, and relays only a preauthorized specific packet from the external network 15 to the internal network 16. The internal network 16 is a network protected by the data diode device 84 against an external unauthorized access.

In this example, the external computer 11 and the data diode device 84 as well as the internal computer 12 and the data diode device 84 communicate with each other using a TCP/IP, that is, an internet protocol suite. The data collection system 83 uses, for example, Ethernet (registered trademark) in a network interface layer of a four hierarchical model of the TCP/IP (corresponding to the first and second layers of an OSI reference model). For the purpose of brief description, in this example, assume that the packet relayed by the data diode device 84 is a packet in which the TCP is used as a protocol in a transport layer. A communication protocol is not specifically limited.

The external computer 11 transmits and receives the packet to and from the internal computer 12 via the external network 15, the data diode device 84, and the internal network 16, similarly to the first embodiment described above.

In a case where the external computer 11 acquires the process data from the internal computer 12, it delivers a packet storing therein a request message described later as the application data to the external network 15. The external computer 11 assigns an IP address of the internal computer 12 to a destination IP address of the packet. If the request message is stored in the packet received by the internal computer 12, the internal computer 12 reads out the process data specified by the request message, and delivers a packet storing therein the read process data to the internal network 16. The external computer 11 extracts the application data such as the process data stored in the received packet.

In the following description, in a case where the packet storing therein the request message is specifically distinguished from other packets, the former packet is referred to as a request packet. In a case where the packet storing therein the process data sent back in response to the request packet is specifically distinguished from other packets, the former packet is referred to as a response packet.

The data diode device 84 includes a first unit 86 connected with the external network 15 and a second unit 87 connected with the internal network 16. When the first unit 86 receives the packet transmitted from the external network 15 toward the internal network 16, it extracts a main packet as a part in the relevant packet to determine whether or not the relevant main packet is registered as first packet registration information described later. If the first unit 86 determines that the main packet in received packet is registered as the first packet registration information, it takes the received packet as a registered packet to activate any one of signal lines Q1, Q2 . . . Qn (see FIG. 11, and if the signal lines Q1, Q2 . . . Qn do not need to be specifically distinguished, they are collectively called the signal line Q) corresponding to the first packet registration information in the registered packet. The second unit 87 identifies contents of the registered packet received by the first unit 86 on the basis of second packet registration information described later corresponding to the activated signal line Q, and generates a packet (restored packet) corresponding to the received registered packet to deliver the generated packet to the internal network 16.

Besides, at this time, if the received packet is a registered packet, the first unit 86 extracts a variable packet included in the relevant received packet to identify a first variable packet registration information corresponding to the relevant variable packet from within a first variable packet reference table (described later) which is preliminarily registered. Here, the variable packet is data associated with the main packet, where, for example, if the main packet is a functional control instruction to the internal computer 12 (for example, a start-up instruction for the imaging means, a pressure control instruction, or the like), the variable packet indicates a configuration instruction regarding an operation for the internal computer 12 to operate on the basis of the relevant control instruction. More specifically, for example, if a basic packet is a start-up instruction for the imaging means, the variable packet is a variable configuration instruction regarding an imaging operation instructing the imaging means about an imaging angle, zoom, or the like, and if the basic packet is a pressure control instruction in the plant, the variable packet is a variable configuration instruction regarding a pressure control operation about a valve opening/closing degree, or the like.

Figure 11:
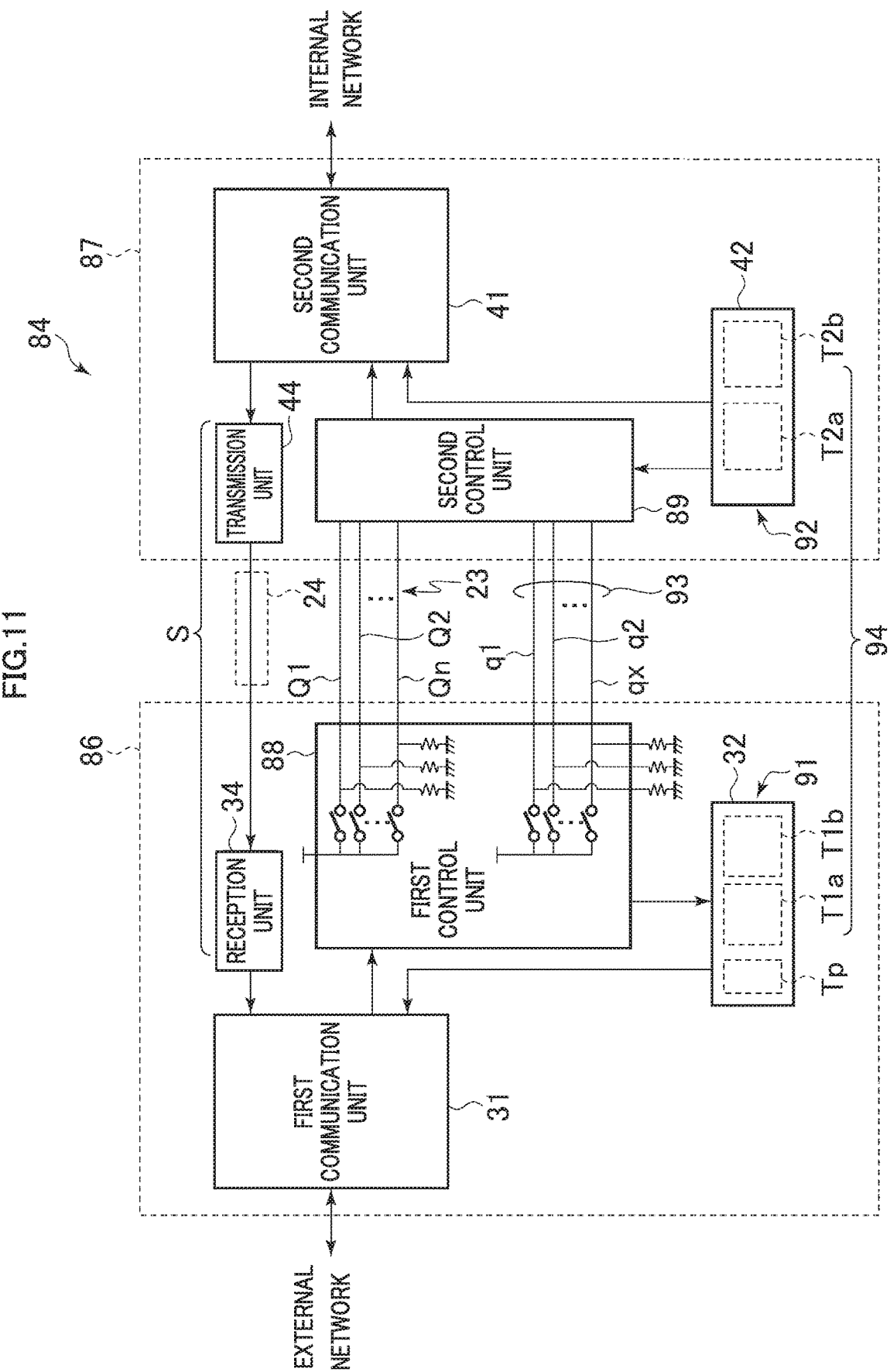
FIG. 11 is a block diagram illustrating a configuration of a data diode device with specific packet relay function.

The first unit 86 activates or inactivates, on the basis of the first variable packet registration information corresponding to the variable packet, each of a plurality of variable packet signal lines q1, q2 . . . qx (see FIG. 11, if the variable packet signal lines q1, q2 . . . qx do not need to be specifically distinguished, they are collectively called a variable packet signal line q). The second unit 87 depends on an activated or inactivated state of the variable packet signal line q to identify corresponding second variable packet registration information in a second variable packet reference table (described later) which is preliminarily registered. The second unit 87 takes the variable packet registered in the identified second variable packet registration information as a restored variable packet equivalent to the variable packet in the packet received in the first unit 86, and delivers this restored variable packet to the internal network 16.

When the data diode device 84 receives the packet from the internal network 16 by the second unit 87, it sends out the received packet to the first unit 86 via a unidirectional transmission path S (see FIG. 11), and the first unit 86 delivers the packet to the external network 15. This allows the process data addressed from the internal computer 12 to the external computer 11 to be transmitted to the external computer 11. The packet relayed to the internal network 16 by the data diode device 84 is not limited to the request packet for acquiring the process data. In the following description, however, the data diode device 84 has some request packets preliminarily registered therein as the packets to be relayed.

In FIG. 11, the data diode device 84 includes the first and second units 86 and 87, a signal line unit 23 constituted by a plurality of signal lines Q, a variable packet signal line unit 93 constituted by a plurality of variable packet signal lines q, and a transmission line path 24 provided between the first unit 86 and the second unit 87. The first unit 86 includes a first communication unit 31, a first storage unit 32, a first control unit 88, and a reception unit 34. The second unit 87 includes a second communication unit 41, a second storage unit 42, a second control unit 89, and a transmission unit 44.

Here, in a case of this embodiment, the variable packet signal line unit 93, which is constituted by a plurality of variable packet signal lines q, for example, 8, 16, or 32 lines q, may relay data of plural bits corresponding to the number of the variable packet signal lines q depending on a state variation, active or inactive, of each variable packet signal line q from the first unit 86 to the second unit 87. This embodiment applies the variable packet signal line unit 93 constituted by a plurality of variable packet signal lines q, but the present invention is not limited thereto, and the variable packet signal line unit constituted by one variable packet signal line q1 may be applied.

The first control unit 88 provided to the first unit 86, and a first reference table T1a and first variable packet reference table T1b stored in the first storage unit 32 in the first unit 86 constitute a packet determination unit 91. Moreover, the second control unit 89 provided to the second unit 87, and a second reference table T2a and second variable packet reference table T2b stored in the second storage unit 42 in the second unit 87 constitute a packet restoration unit 92. The packet determination unit 91, the packet restoration unit 92, the signal line unit 23, and the variable packet signal line unit 93 constitute a packet relay unit 94. The transmission line path 24, the reception unit 34 in the first unit 86, and the transmission unit 44 in the second unit 87 constitute the unidirectional transmission path S.

The first communication unit 31 in the first unit 86 is connected with the external network 15. This first communication unit 31 receives the packet addressed to the internal network 16. In this example, the first communication unit 31 receives a packet assigned the destination IP address of the first packet registration information registered in the first reference table T1a among the packets from the external network 15. A network address of the internal network 16 may be preset in the first communication unit 31, for example, so that a packet whose network address part of the destination IP address matches the network address may be received.

The first communication unit 31 extracts, from the received packet, the source IP address, the destination IP address, and the application data (hereinafter, they are collectively referred to as reception packet information), and a source port number to transmit to the first control unit 88. The first communication unit 31 delivers, as the response packet, the packet received from the reception unit 34 constituting the unidirectional transmission path S to the external network 15. This allows the response packet to be transmitted to the external computer 11 which is a source of the request packet corresponding to the response packet.

Figure 12A:
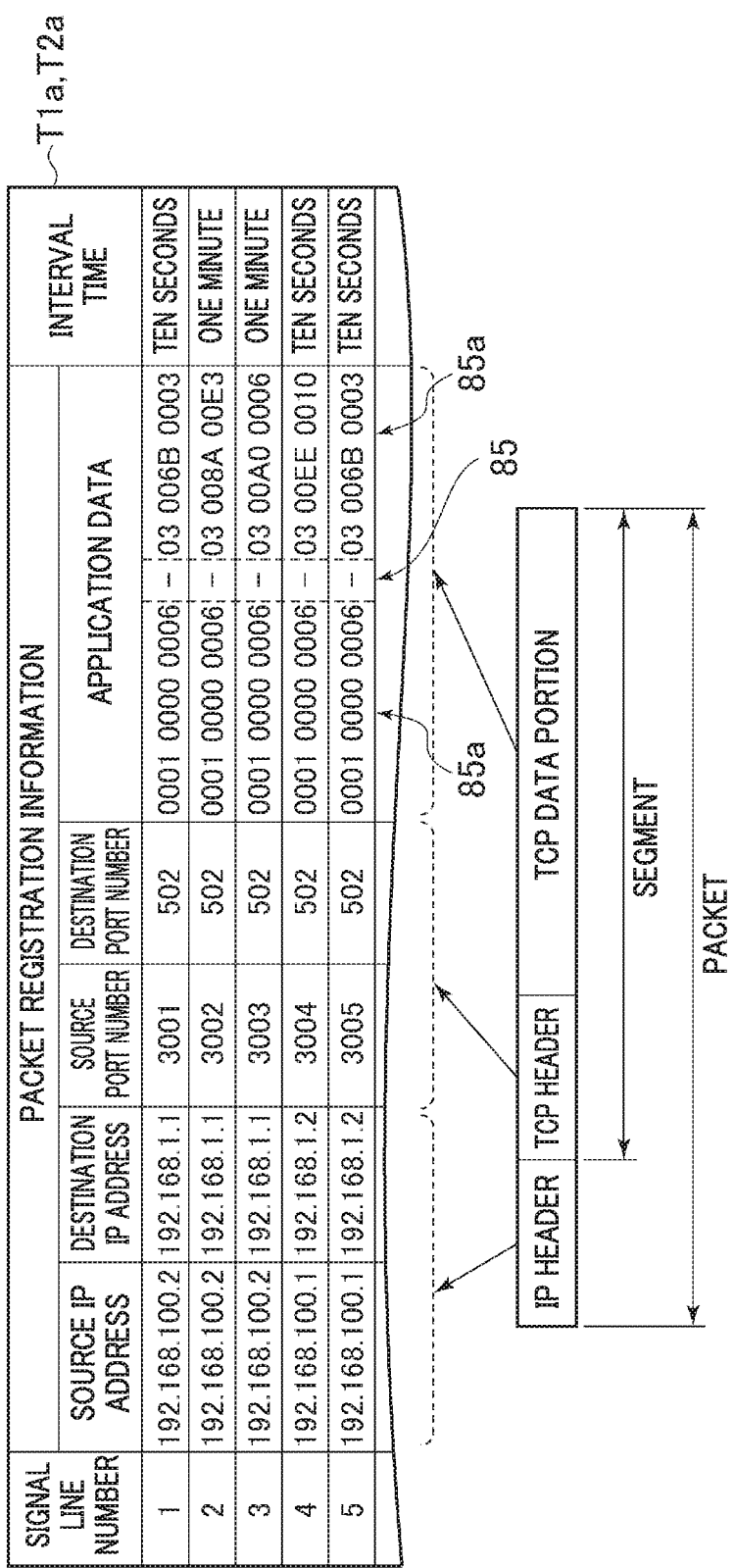
FIG. 12A is an illustration of an example of contents of each reference table.

The first storage unit 32 stores the above first reference table T1a and first variable packet reference table T1b, and the port number conversion table Tp. In the first reference table T1a, as illustrated in FIG. 12A, registered are a plurality of records for specific packets authorized to be relayed, each record including the first packet registration information where information is indicated excluding a variable packet 85 in the application data, a signal line number indicating one signal line Q corresponding to this first packet registration information, and an interval time.

The signal line number and the first packet registration information in each record correspond one-to-one. The first packet registration information in this example includes the source IP address and the destination IP address stored in the IP header in the packet, the source port number and the destination port number stored in the TCP header, and the application data stored in the TCP data portion.

A main packet 85a, which is the rest of the application data excluding the variable packet 85 having been included in the packet, is registered in the first packet registration information. In this example also, the source IP address in the first packet registration information is the source information, and the destination IP address is the destination information. Combination of the both information and the partial application data (main packet 85a) excluding the variable packet 85 is used to determine whether or not the received packet is the registered packet. Hereinafter, the "application data" in the description of the packet registration information (the first packet registration information and the second packet registration information) refers to the main packet 85a as a part excluding the variable packet 85.

The source IP address, the destination IP address, the destination port number, and the application data registered as the first packet registration information are those of the request packet actually transmitted from the external computer 11 to the internal computer 12. In contrast to this, the source port number in the first packet registration information is preassigned a port number unique to each piece of the first packet registration information.

An Modbus/TCP is used as an application protocol in this example. For this reason, a message complying with the TCP/Modbus is registered as the application data in the first packet registration information. The TCP/Modbus message includes, as is well known, data such as a function code instructing to read and write the data (process data) out and into a register provided to the internal computer 12, and an address range for reading and writing. If the process data read out is the same, the TCP/Modbus request message is the same.

In the port number conversion table Tp, as illustrated in FIG. 4, registered by the first control unit 88 is a conversion record in which a pre-conversion port number and a post-conversion port number are associated with each other. This port number conversion table Tp is used to convert the destination port number of the response packet into the source port number of the corresponding request packet (the request packet requesting the response packet) when the response packet is transmitted from the internal computer 12 to the external computer 11.

In FIG. 11, the first control unit 88 determines whether or not the packet received by the first communication unit 31 as described above is the registered packet. In this determination, the first control unit 88 checks whether or not the reception packet information excluding the variable packet 85 in the application data is included in any first packet registration information in the first reference table T1a. In this determination, in the case where the reception packet information excluding the variable packet 85 is included in any one of the pieces of the first packet registration information, that is, if all of the source IP address, the destination IP address, and the partial application data excluding the variable packet 85 (main packet 85a) match any one of the pieces of the first packet registration information, the received packet is determined to be the registered packet. The first control unit 88 acquires the signal line number corresponding to the first packet registration information including the reception packet information (hereinafter, referred to as a first relevant packet registration information), and activates the signal line Q of the acquired signal line number.

The first control unit 88 registers a conversion record in the port number conversion table Tp every time it is determined that the received packet is the registered packet. In this registration, the pre-conversion port number is set to the source port number of the registered packet, and the post-conversion port number is set to the source port number preliminarily registered in the first relevant packet registration information. The conversion record is deleted by the first control unit 88 after the elapse of the interval time in the first relevant packet registration information that is a basis for the post-conversion port number, for example.

The destination port number of the packet transmitted by the information requesting side external computer 11 to the information providing side internal computer 12 is generally fixed for each application of a communication partner. Therefore, in this example, if the received packet matches the application data in the first packet registration information, the destination port number is considered also to match, and the destination port number is used to determine whether or not the received packet is the registered packet. Of course, the destination port number may be used as one piece of the destination information for the determination. On the other hand, the source port number of the packet transmitted by the external computer 11 is generally assigned an arbitral port number by the external computer 11. For this reason, in this example, the source port number is not used to determine whether or not the received packet is the registered packet. Of course, if the source port number is fixed, it can be used as one piece of the source information. In this case, the above port number conversion table Tp does not need to be created.

A time when the first control unit 88 receives a new packet having the same reception packet information as the previously received packet is within the interval time in the first packet registration information corresponding to the previously received packet from a time when the first control unit 88 responds to the previously received packet to activate the signal line Q, the first control unit 88 does not activate the signal line Q for the new packet. This allows the internal computer 12 to be protected against a so-called flood attack that involves transmitting a large amount of packets. A timing start point of the interval time may be the time when receiving the previously received packet.

The number of the signal lines Q may be equal to or more than that in the first packet registration information registered in the first reference table T1*a*. In this example, a metal line is used for the signal line Q. The first control unit 88, which has a plurality of switches connected with the respective signal lines Q, turns on a switch connected with a signal line number corresponding to the first relevant packet registration information. This activates the signal line Q corresponding to the first relevant packet registration information, or sets to a high level in this example. An active state of the signal line Q may be low level. The signal line Q may be able to notify the second unit 87 of whether or not it is active. For example, a light-emitting diode and a light receiving element may be used for the signal line Q so that, when the line Q is activated, the first unit 86 lights the light-emitting diode and the second unit 87 detects the light-emitting diode lighting by way of the light receiving element.

In addition to such a configuration, the first control unit 88, when determining that the partial reception packet information excluding the variable packet 85 is included in any one of the pieces of the first packet registration information in the first reference table T1*a* and then activating the corresponding signal line Q, determines whether or not the variable packet included in the application data in the reception packet information corresponds to any piece of the first variable packet registration information in the first variable packet reference table T1*b*.

Figure 12B:
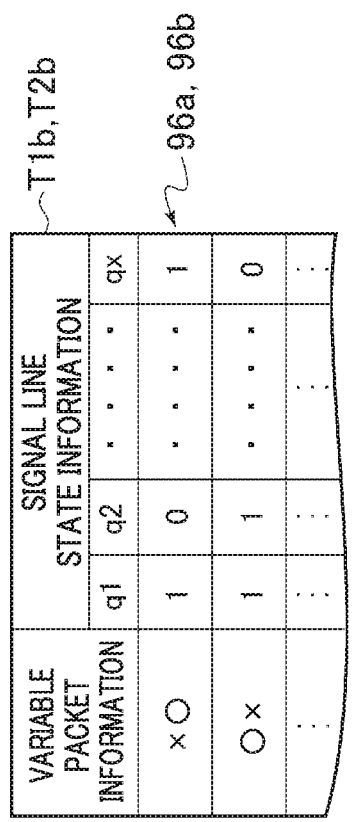
FIG. 12B is an illustration of an example of contents of each variable packet reference table.

In the first variable packet reference table T1*b*, as illustrated in FIG. 12B, registered are a plurality of pieces of first variable packet registration information 96*a* in which signal line state information indicating whether each variable packet signal line q is active or inactive is associated with each variable packet. In FIG. 12B, when the variable packet signal line q is active, "1" is set, and when the variable packet signal line q is inactive, "0" is set, and whether each variable packet signal line q is active or inactive is preliminarily registered for each variable packet.

For example, if the variable packet included in the application data in the registered packet is "xo", the first control unit 88 identifies the first variable packet registration information on the first row as first relevant variable packet registration information in which the variable packet "xo" is registered as the variable packet information on the basis of the first variable packet reference table T1*b*. In accordance with the signal line state information corresponding to this first relevant variable packet registration information, the first control unit 88 activates the variable packet signal line q1, inactivates the variable packet signal line q2, and activates or inactivates all of the rest of the variable packet signal lines q. The metal line is used for the respective variable packet signal line q.

In this case, the first control unit 88 has a switch for each variable packet signal line q, and turns on or off the switch connected with each variable packet signal line q in accordance with the signal line state information corresponding to the first relevant variable packet registration information. This allows the variable packet signal line q to be individually activated (set to the high level in this example) or inactivated (set to the low level in this example) in accordance with the signal line state information corresponding to the first relevant variable packet registration information. An active state of the variable packet signal line q may be the low level. The variable packet signal line q may be variously configured so long as the second unit 87 is notified of whether the line q is active or not. For example, a light-emitting diode and a light receiving element may be used for the variable packet signal line q so that, when the line q is activated, the first unit 86 lights the light-emitting diode and the second unit 87 detects the light-emitting diode lighting by way of the light receiving element.

The reception unit 34 receives the packet from the second unit 87 via the transmission line path 24. The reception unit 34 also converts the destination port number of the packet received from the second unit 87 with reference to the port number conversion table Tp. In other words, the reception unit 34 searches the port number conversion table Tp for the post-conversion port number having the destination port number of the received packet to replace the destination port number of the received packet with the pre-conversion port number corresponding to that post-conversion port number. This replaces the destination port number of the response packet with the source port number of the request packet corresponding to that destination port number. The reception unit 34 transmits the packet whose destination port number is replaced to the first communication unit 31.

The second control unit 89 in the second unit 87 is connected with the respective signal lines Q. In the second storage unit 42, the second reference table T2*a* having the same content as the first reference table T1*a* is written as illustrated in FIG. 12A. In the second reference table T2*a*, the packet registration information in each record is the second packet registration information, and the second packet registration information is associated with the signal lines Q (signal line numbers) having the same content as in the first packet registration information. This allows the first and second packet registration information for the same packet to be registered to correspond to the same signal line Q.

The second control unit 89, in response to any of the signal lines Q being activated, reads out from the second reference table T2*a* the second packet registration information associated with the signal line number of the activated signal line Q, that is, the second packet registration information having the same content as the first relevant packet registration information (hereinafter, referred to as second relevant packet registration information, in a case of being specifically distinguished from other second packet registration information), and generates the packet assigned the application data, source IP address, destination IP address, source port number, and destination port number in the second relevant packet registration information. This allows a restored packet equivalent to the packet received by the first unit 86 to be generated on the basis of the second relevant packet registration information. The interval time may be omitted in the second reference table T2*a*.

In addition to such a configuration, the second control unit 89 in the second unit 87 is connected with the respective variable packet signal lines Q. In the second storage unit 42, the second variable packet reference table T2*b* having the same content as the first variable packet reference table T1*b* is written as illustrated in FIG. 12B. In the second variable packet reference table T2*b*, the variable packet and signal line state information in each record are second variable packet registration information 96*b*. In the second variable packet registration information 96*b*, the variable packet the same as the first variable packet registration information 96*a* is registered in the variable packet information as the second variable packet. In the second variable packet registration information 96*b*, the signal line state information having the same content as the first variable packet registration information 96*a* is respectively associated with the second variable packet as in the first variable packet registration information 96*a*.

In response to the respective variable packet signal lines q being activated or inactivated, the second control unit 89 identifies the signal line state information indicating the content the same as the active or inactive states of the respective variable packet signal lines q from within the second variable packet reference table T2*b*. Then, the second control unit 89 reads out the variable packet associated with the identified signal line state information (that is, the second variable packet having the same content as the first relevant variable packet) from the second variable packet reference table T2*b* to generate a restored variable packet equivalent to the variable packet in the packet received by the first unit.

In this way, the second control unit 89 can generate the restored packet equivalent to the packet received by the first unit 86 and the restored variable packet equivalent to the variable packet in the packet received by the first unit, and sends the packet generated based on these restored packets to the second communication unit 41. The second communication unit 41 is connected with the internal network 16. The second communication unit 41 delivers the packet generated by the second control unit 89 to the internal network 16 to send the relevant packet to the internal computer 12. The second communication unit 41 also sends the packet received from the internal network 16 to the transmission unit 44.

In the case where the packet is generated from the second relevant packet registration information and the restored variable packet, the source port number may be replaced with an arbitral port number, and the source IP address may be replaced with the IP address of the second unit 87. In this case, correspondingly to this, the destination port number and destination IP address of the packet sent back by the internal computer 12 are replaced with the source port number and source port number in the second relevant packet registration information, and then, that packet is transmitted to the first unit 86.

The unidirectional transmission path S, which is constituted, as described above, by the reception unit 34 in the first unit 86, the transmission unit 44 in the second unit 87, and the transmission line path 24, is a data diode of which the communication direction is physically limited to one direction from the second unit 87 side toward the first unit 86 side. The unidirectional transmission path S is similar to that described above in the first embodiment, and the description thereof is omitted here.

As describe above, the packet received by the reception unit 34 is sent to the first communication unit 31 after the destination port number thereof is converted, and is delivered by the first communication unit 31 to the external network 15. This allows the response packet for the process data to be transmitted to the external computer 11 which requests that process data from the internal computer 12.

A method of transmitting the application data is not limited to the above method. For example, the application data obtained from the response packets may be temporarily accumulated in a buffer or the like, and then, collectively transmitted via the unidirectional transmission path S and the information such as the destination IP address, and the destination port number may be transmitted. In this case, on the first unit 86 side, the packet to be transmitted to the external computer 11 is reconfigured from the collectively transmitted application data and the information such as the destination IP address and the destination port number, and transmitted.

At least the application data and information from which the first unit 86 can identify a destination of the application data may be sent from the second unit 87 to the first unit 86 using the unidirectional transmission path S. For example, the application data and destination port number extracted from the packet may be transmitted. In this case, the destination IP address of the response packet may be set to the source IP address in the first packet registration information whose source port number matches the destination port number.

The first unit 86 and the second unit 87 configured as described above may perform operations of the transport layer and lower layers in order to perform the communication, with respect to the first network apparatus on the external network 15 and the second network apparatus on the internal network 16, respectively, where the operations of the transport layer and lower layers do not vary depending on the application or the connected apparatus, and therefore, a simple configuration can be achieved so long as the fixed functions are attained.

Each of the functions of the first and second units 86 and 87 constituting the data diode device 84 may be configured by use of a personal computer, for example. In this case, for example, two personal computers are provided, of which one is made to serve as the first unit 86 and the other as the second unit 87 by installing programs for realizing the functions of the first and second units 86 and 87. As the signal line Q and the variable packet signal line q, used is a connection between terminals of general purpose input and output ports or the like mounted on the personal computers. As the unidirectional transmission path S, used is only one direction in bidirectional signal lines such as RS-232C of the personal computers.

On the other hand, the first and second units 86 and 87 may be achieved by using, for example, an ASIC (application specific integrated circuit), a programmable logic device (PLD) represented by an FPGA (Field Programmable Gate Array). In the PLD, any circuit configuration is possible depending on a combination of a plurality of circuit blocks and various processing circuits can be formed, but it is difficult to change the processing circuit itself after configuring the circuit. Therefore, using the ASIC or the PLD in this way can disable function modification, such as rewrite of the contents of the first reference table T1*a* and first variable packet reference table T1*b*, and can make it difficult to change operational contents of the first control unit 88. Then, this can significantly lower a risk of the unauthorized access from the external network 15 to the internal computer 12.

Next, reference will be made to effects of the above configuration using an example where the second external computer 11*b* is operated to acquire the process data from the first internal computer 12*a*. In the following description, as illustrated in FIG. 10, assume that an IP address of the first external computer 11*a* is "192.168.100.1", and an IP address of the second external computer 11*b* is "192.168.100.2". Moreover, assume that an IP address of the first internal computer 12*a* is "192.168.1.1", and an IP address of the second internal computer 12*b* is "192.168.1.2". Further, assume that the content illustrated in FIG. 12A is preliminarily registered in the first reference table T1*a* and the second reference table T2*a*, and the content illustrated in FIG. 12B is preliminarily registered in the first variable packet reference table T1*b* and the second variable packet reference table T2*b*.

First, the second external computer 11*b* is operated to instruct to acquire the process data from the first internal computer 12*a*. On the basis of this instruction, the second external computer 11*b* establishes a connection between the first internal computer 12*a* and the TCP. Therefore, the second external computer 11*b* first broadcasts an ARP request in which the IP address of the first internal computer 12*a* is stored as the destination IP address.

Figure 13:
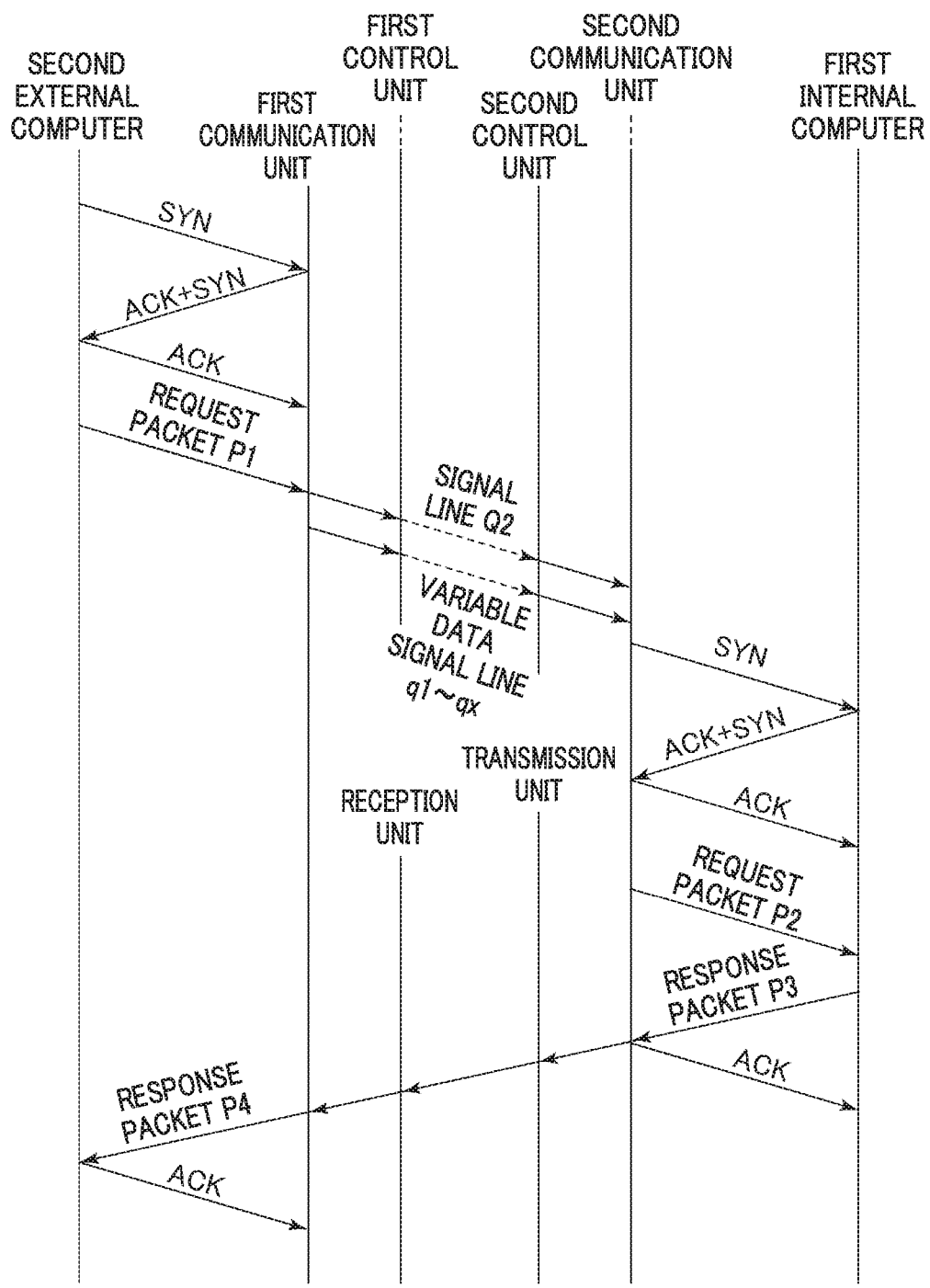
FIG. 13 is an illustration of an example of a communication sequence.

Since the first packet registration information in which the destination IP address is set to the IP address of the first internal computer 12*a* is registered in the first reference table T1*a*, the first communication unit 31 in the first unit 86 sends back, in response to the above ARP request, an ARP reply storing a MAC address of the first communication unit 31 to a source of the ARP request. This allows the second external computer 11*b* to acquire the MAC address of the first communication unit 31 from the ARP reply. In the subsequent procedures, if the second external computer 11*b* delivers the packet in which the destination IP address is set to the IP address of the first internal computer 12*a*, it sets a destination MAC address to the MAC address of the first communication unit 31. Then, the second external computer 11*b* transmits an SYN packet in which a destination IP address is set to the IP address of the first internal computer 12*a*. As a result, as illustrated in FIG. 13, the SYN packet, an ACK+the SYN packet, and an ACK packet are transmitted and received between the second external computer 11*b* and the first communication unit 31 to establish the TCP connection. A source MAC address in a case where each of the external computer 11, the internal computer 12, and the first and second communication units 31 and 41 transmits the packet is an MAC address of itself.

After establishing the TCP connection, the second external computer 11*b* generates a request packet P1 (see FIG. 13 and FIG. 6) in which the request message depending on the process data to be acquired is stored in the TCP data portion, and delivers the request packet P1 to the external network 15.

The request packet P1 is received by the first communication unit 31, and the reception packet information and source port number extracted from the request packet P1 are sent to the first control unit 88. The first control unit 88, once receiving the reception packet information and the source port number, checks whether or not the reception packet information is included in any piece of the first packet registration information registered in the first reference table T1*a* to determine whether or not the request packet P1 is the registered packet. Specifically, the first control unit 88 determines whether or not the partial reception packet information excluding the variable packet corresponds to any piece of the first packet registration information registered in the first reference table T1*a*.

If no first packet registration information including the reception packet information is in the first reference table T1*a*, the request packet P1 is determined to be not the registered packet. In the case of determining not to be the registered packet in this way, the first control unit 88 disconnects the connection between the first communication unit 31 and the second external computer 11*b*, for example. On the other hand, if the first packet registration information including the reception packet information, that is, the first relevant packet registration information is in the first reference table T1*a*, the request packet P1 is determined to be the registered packet. Then, in this case, the signal line Q corresponding to the first relevant packet registration information is activated (set to the high level) for a predetermined time period.

If the contents of the application data in the request packet P1 are, for example, "0001 0000 0006-03 008A 00E3" (which is the application data on the second row in FIG. 12A), the first packet registration information corresponding to the signal line number "2" in the first reference table T1*a* is the first relevant packet registration information. The character "-" in the application data represents an area where the variable packet is allocated, and in this instance, matching of the first reference table T1*a* and the application data is performed by use of the main packet excluding the variable packet in the reception packet information (here, "0001 0000 0006-03 008A 00E3") 85*a*, as described above. For the signal line unit 23, the first control unit 88 activates the signal line Q2 of the signal line number "2". This conveys that the first unit 86 receives the packet including the first packet registration information corresponding to the signal line number "2" by way of the signal line Q2, from the first control unit 88 to the second control unit 89, as illustrated by a broken line in FIG. 13.

In addition to this, at this time, the first control unit 88 checks which first variable packet registration information registered in the first variable packet reference table T1*b* the variable packet in the reception packet information corresponds to. In this case, if the reception packet information corresponds to any piece of the first packet registration information registered in the first reference table T1*a*, the variable packet in the reception packet information may necessarily correspond to any piece of the first variable packet registration information in the first variable packet reference table T1b.

However, it is not necessarily to be limited to this, and, for example, even if the reception packet information corresponds to any piece of the first packet registration information registered in the first reference table T1a, the variable packet in the reception packet information may correspond to no first variable packet information registered in the first variable packet reference table T1b. When the variable packet in the reception packet information is not in the first reference table T1a, for example, a predefined state may be set such as that the respective variable packet signal lines q are all activated or inactivated.

If the variable packet included in the reception packet information is registered as the variable packet information in the first variable packet reference table T1b, the respective variable packet signal lines q are activated (set to the high level) or inactivated (set to the low level) for a predetermined time period in accordance with the signal line state information associated with the relevant variable packet information.

In a case where the contents of the variable packet having been allocated in the application data in the request packet P1 (here, the packet having been allocated on an area of "-" in "0001 0000 0006-03 008A 00E3") are, for example, "ox", the variable packet signal line q1 is activated (indicated by "1" in FIG. 12B) and the variable packet signal line q2 is inactivated (indicated by "0" in FIG. 12B) in accordance with the signal line state information associated with the variable packet information "ox" in the first variable packet reference table T1b. The all other variable packet signal lines q than the above are also activated or inactivated in accordance with the signal line state information associated with the variable packet information "ox" in the first variable packet reference table T1b. In this way, activating or inactivating the respective variable packet signal lines q1 to qx conveys the signal line state information from the first control unit 88 to the second control unit 89, as illustrated by a broken line in FIG. 13.

The first control unit 88 also registers the conversion record corresponding to the request packet P1 in the port number conversion table Tp. As illustrated in FIG. 6, a conversion record R1 is registered in which the pre-conversion port number is set to the source port number "1501" of the request packet P1 and the post-conversion port number is set to the source port number "3002" in the first relevant packet registration information.

On the other hand, when any one signal line Q is activated as described above, the second control unit 89 identifies the signal line number of the activated signal line Q. Then, the second control unit 89 reads out from the second reference table T2a the second packet registration information corresponding to the identified signal line number, that is, the second relevant packet registration information having the same content as the first relevant packet registration information.

At this time, the second control unit 89 also depends on an activated or inactivated state of the respective variable packet signal line q to identify the corresponding signal line state information from within the second variable packet reference table T2b. Then, the second control unit 89 reads out from the second variable packet reference table T2b the variable packet information corresponding to the identified signal line state information, that is, the variable packet "ox" the same content as the variable packet "ox" received by the first control unit 88.

Then, the TCP connection is established between the second communication unit 41 and a network apparatus whose IP address is the destination IP address of the second relevant packet registration information. The second communication unit 41 uses the ARP to acquire the MAC address corresponding to the destination IP address in the second relevant packet registration information, and thereafter, uses the destination IP address in the second relevant packet registration information to transmit and receive the SYN packet, the ACK+the SYN packet, and the ACK packet so as to establish the TCP connection.

Once the TCP connection is established, the second control unit 89 generates a packet having the application data of the second relevant packet registration information to which added are the TCP header having the destination port number and source port number in the second relevant packet registration information, and the IP header having the destination IP address and source IP address in the second relevant packet registration information, and further, the variable packet identified based on the second variable packet reference table T2b being added in the application data. Then, this generated packet is delivered from the second communication unit 41 to the internal network 16.

In the case where the signal line Q2 is activated as described above, the second packet registration information corresponding to the signal line number "2" is the second relevant packet registration information. Since the destination IP address in the second relevant packet registration information is that of the first internal computer 12a the same as the request packet P1, the TCP connection is established between the second communication unit 41 and the first internal computer 12a. Moreover, since the second relevant packet registration information has the same content as the first relevant packet registration information, and the variable packet information identified based on the second variable packet reference table T2b has the same content as the variable packet information used for identifying the signal line state information based on the first variable packet reference table T1b, the second control unit 89 generates a request packet P2 (see FIG. 13 and FIG. 6) having content substantially the same as the request packet P1. In other words, the request packet P2 generated by the second unit 87 is the same as the request packet P1 received by the first unit 86 in the source IP address, the destination IP address, the destination port number, and the request message (application data including the variable packet 85 and the main packet 85a), and has the source port number of "3002" which is the source port number in the first and second relevant packet registration information.

With the simple configuration using the signal line Q and the variable packet signal line q in this way, the contents of the packet to be transmitted to the internal network 16 and the timing of transmitting that packet are conveyed from the first unit 86 to the second unit 87, and the packet equivalent to the packet received by the first unit 86 is restored from the second relevant packet registration information and the variable packet information, and delivered to the internal network 16.

The request packet P2 delivered to the internal network 16 is received by the first internal computer 12a. The first internal computer 12a extracts the request message from the request packet P2 to process the extracted message using a predetermined application depending on the destination port number. This allows the process data depending on the request message to be extracted from the specified address range to generate a response packet P3 (see FIG. 13 and FIG. 6) storing that process data. The response packet P3 is delivered from the first internal computer 12a to the internal network 16. An ACK flag for an acknowledgement response to the request packet P2 is set in the response packet P3, for example, but the ACK packet may be transmitted separately from the response packet P3. The source and the destination in the response packet P3 are set inversely to the request packet P2 as described in the first embodiment using FIG. 6.

The response packet P3 delivered to the internal network 16, which has the destination MAC address set to the MAC address of the second communication unit 41, is received by the second communication unit 41. The second communication unit 41 sends back the ACK packet in response to receiving the response packet P3 and sends the response packet P3 to the transmission unit 44. This response packet P3 is sent from the transmission unit 44 via the transmission line path 24 to the reception unit 34 in the first unit 86. In a case where a plurality of response packets is sent back to one request packet, the respective response packets may be serially transmitted from the second unit 87 via the unidirectional transmission path S to the first unit 86.

When the reception unit 34 receives the response packet P3, it transmits to the first communication unit 31 a response packet P4 (see FIG. 13 and FIG. 6) which is obtained by referring to the port number conversion table Tp to convert the destination port number of the response packet P3. By doing so, the destination port number of the response packet P4 is converted into "1501" the same as the source port number of the request packet P1 as a derivation, as illustrated in FIG. 6.

As illustrated in FIG. 13, the response packet P4 is delivered from the first communication unit 31 to the external network 15. At this time, the first communication unit 31 corrects the information on the IP header and TCP header of the response packet P4, such as a sequence number or an acknowledgement response number, so that the response packet P4 be the packet to respond to the previous request packet P1. In a case where the application data in the response packet P4 cannot be transmitted by one packet, it may be divided into a plurality of packets to be transmitted.

The response packet P4, which has the destination IP address set to the IP address of the second external computer 11b, is received by the second external computer 11b. In response to receiving the response packet P4, the ACK packet is sent back from the second external computer 11b, and this ACK packet is received by the first communication unit 31. On the other hand, in the second external computer 11b, the process data is extracted from the received response packet P4 and passed to a requestor application depending on the destination port number. Since the destination port number of the response packet P4 is the same as the source port number assigned to the request packet P1, the process data is passed to the requestor application.

In the configuration described above, when the request packet is sent from the external computer 11 to the internal computer 12, if the partial reception packet information excluding the variable packet in the request packet is the same as the first packet registration information preliminarily registered in the first reference table T1a, the first unit 86 in the data diode device 84 activates a predetermined signal line Q associated with the relevant first packet registration information. By doing so, the second unit 87 in the data diode device 84 can identify the second packet registration information the same as the first packet registration information from within the second reference table T2a depending on which signal line Q is activated, and generate the packet equivalent to the reception packet information received by the first unit 86.

In the data diode device 84, if the reception packet information of the packet received from the external network 15 is not registered in the first reference table T1a, the first control unit 88 does not establish connection of the signal line Q as described above, and thus, no packet is transmitted from the first unit 86 to the second unit 87. This allows the data diode device 84 to prevent an access to the internal computer 12 from an unauthorized computer on the external network 15, and therefore, no unauthorized access is performed to prevent the information leak or the like.

The data diode device 84 transmits the packet from the second unit 87 to the first unit 86 using the unidirectional transmission path S in which the communication direction is limited, while it transmits the packet content from the first unit 86 to the second unit 87 depending on whether or not any signal line Q is activated. Therefore, even if a computer on the external network 15 side attempts illegal modification to the data diode device 84, the second unit 87 is difficult to operate and an unauthorized packet cannot be sent to the internal computer 12. Therefore, the data diode device 84 can reliably prevent the unauthorized access to the internal computer 12 while transmitting the packet from the second unit 87 to the first unit 86.

Further, separately from this, the first unit 86 in the data diode device 84 extracts the variable packet from the reception packet information of the packet received from the external network 15. Then, the first unit 86 identifies the variable packet information the same as the extracted variable packet from within the first variable packet reference table T1b, and activates or inactivates the respective variable packet signal lines q in accordance with the signal line state information preliminarily associated with the identified variable packet information.

The second unit 87 recognizes a connection state of the respective variable packet signal lines q which are activated or inactivated by the first unit 86 on the basis of the variable packet, and identifies which piece of the signal line state information in the second variable packet reference table T2b the recognized state corresponds to. Then, the second unit 87 reads out the variable packet information associated with the signal line state information which is identified based on the active or inactive states of the respective variable packet signal lines q from the second variable packet reference table T2b to generate a restored variable packet equivalent to the variable packet in the packet received by the first unit 86.

This disables the data diode device 84 from directly transmitting the packet from the first unit 86 side to the second unit 87 side, which ensures reliable security without the second unit 87 being modified by the external network 15 side. Further, the variable packet can also be sent to the internal network 16 separately from the main packet, through which variable packet various pieces of data can be transmitted from the external network 15 to the internal network 16.

Other Embodiments

In the above description, the Modbus/TCP is used as the application protocol, but the application protocol is not specifically limited. A plurality of pieces of application data in the first and second packet registration information registered in the first and second reference tables T1a and T2a may be based on different kinds of application protocols. In other words, this data diode device 84 can treat even the packets different in the application protocol with no distinction.

The above data diode devices 14 and 84 relay the packet of the TCP as the protocol in the transport layer, but, for example, in a case where both the TCP and the UDP are used, information for identifying a protocol type is added to the first and second packet registration information. In this case, the second unit 87 generates a packet assigned a header depending on the protocol type of the second packet registration information, and performs communication control complying with a protocol indicated by the protocol type. This protocol type, which is needed for the second unit 87 to generate the packet, may be omitted in the first packet registration information. Of course, if it is determined whether or not the received packet is the registered packet inclusive of the protocol type, the protocol type is needed in the first packet registration information.

The above described embodiments describe the case where the data diode devices 14 and 84 are configured to receive the application data including both the variable packet and the main packet, but the present invention is not limited thereto, and, for example, the data diode devices 14 and 84 may be configured to receive the application data including the main packet as a part excluding the variable packet, and receive, separately from this, the application data not including the main packet but including the variable packet.

Further, the above embodiments describe the case where the process data is acquired, but the acquired data is not limited thereto. The data diode devices 14 and 84 can also be used for, for example, a case where commands and data controlling the operation of the apparatus in the plant and the operation of the internal computer 12 itself are transmitted to the internal computer 12.

In the above embodiments, the destination IP address in the packet registration information in each of the first and second reference tables T1*a* and T2*a* is the IP address (unicast address) of the individual internal computer 12, but is not limited thereto. For example, a multicast address may be used for the destination IP address in the packet registration information so that the packet can be simultaneously transmitted to a plurality of internal computers 12.

The above embodiments use the source IP address as the source information for identifying the source, and the destination IP address as the destination information for identifying the destination, but the source information and the destination information are not limited to these addresses, and information depending on the communication protocol may be used. The packet registration information is configured as the application data including the source IP address, the destination IP address, the source port number, the destination port number, and the main packet as a part excluding the variable packet, but is not limited thereto, and may be configured to include information depending on the communication protocol.

REFERENCE SIGNS LIST

11, 12 Computer
14, 84 Data diode device with specific packet relay function
15, 16 Network
21, 22 Unit
23 Signal line unit
31, 41 Communication unit
33, 43 Control unit
53 Packet relay unit
60, 70 FPGA
93 Variable packet signal line unit
94 Packet relay unit
S Unidirectional transmission path
T1, T2, T1*a*, T2*a* Reference table
T1*b*, T2*b* Variable packet reference table

The invention claimed is:

1. A data diode device with specific packet relay function comprising:
    a first unit connected with a first network;
    a second unit connected with a second network;
    a unidirectional transmission path through which a packet received from the second network is configured to be transmitted in only one direction from the second unit to the first unit; and
    a packet relay unit configured to relay, to the second network, only specific packets authorized among packets received from the first network, the packet relay unit comprising:
        a signal line unit having a plurality of signal lines between the first unit and the second unit;
        a packet determination unit provided in the first unit and having pieces of first packet registration information preliminarily registered therein for the specific packets authorized to be relayed, the packet determination unit being configured to: determine whether or not a packet from the first network is a registered packet for which one of the pieces of first packet registration information is registered; and activate, if the packet from the first network is the registered packet, a signal line corresponding to the one of the pieces of first packet registration information for the registered packet among the plurality of signal lines; and
        a packet restoration unit provided in the second unit and having pieces of second packet registration information preliminarily registered therein for the specific packets authorized to be relayed, the packet restoration unit being configured to: generate, in response to one of the plurality of signal lines being activated, a restored packet equivalent to the packet received by the first unit based on one of the pieces of second packet registration information corresponding to the activated one of the plurality of signal lines; and deliver the restored packet to the second network.

2. The data diode device with specific packet relay function according to claim 1, wherein
    the first unit comprises a first communication unit configured to receive a packet from a first network apparatus on the first network and transmit a packet received through the unidirectional transmission path to the first network apparatus,
    the packet determination unit comprises:
        a first reference table in which the pieces of first packet registration information each including source information, destination information and application data of a packet are registered for each of the plurality of signal lines; and
        a first control unit, wherein if source information, destination information, and application data of the packet received from the first network is included in one of the pieces of first packet registration information registered in the first reference table, the first control unit is configured to activate the signal line corresponding to the one of the pieces of first packet registration information among the plurality of signal lines, the second unit comprises a second communication unit configured to: deliver the restored packet to the second network; receive a packet from a second network apparatus on the second network; and send the received packet to the first unit through the unidirectional transmission path, and the packet restoration unit comprises:
- a second reference table in which the pieces of second packet registration information each including source information, destination information, and application data of a packet are registered in such a way that one of the pieces of first packet registration information and one of the pieces of second packet registration information for the same packet correspond to the same signal line among the plurality of signal lines; and
- a second control unit configured to generate the restored packet having the source information, the destination information, and the application data based on one of the pieces of second packet registration information corresponding to the activated signal line.

3. The data diode device with specific packet relay function according to claim 2, comprising first and second programmable logic devices, each of which is configured to combine a plurality of circuit blocks to provide any circuit configurations, wherein
- the first programmable logic device is configured to combine the plurality of circuit blocks to form at least the first control unit of the first unit,
- the second programmable logic device is configured to combine the plurality of circuit blocks to form at least the second control unit of the second unit, and
- the signal line unit connects the first programmable logic device with the second programmable logic device.

4. A data diode device with specific packet relay function comprising:
- a first unit connected with a first network;
- a second unit connected with a second network;
- a unidirectional transmission path through which a packet received from the second network is configured to be transmitted in only one direction from the second unit to the first unit; and
- a packet relay unit configured to relay, to the second network, only specific packets authorized among packets received from the first network, the packet relay unit comprising:
  - a signal line unit having a plurality of signal lines between the first unit and the second unit;
  - a variable packet signal line unit having one or more variable packet signal lines between the first unit and the second unit;
  - a packet determination unit provided in the first unit and having, as pieces of first packet registration information preliminarily registered therein for each of the specific packets, partial main packets excluding variable packets in the specific packets, the packet determination unit being configured to: determine whether or not a packet from the first network is a registered packet for which one of the pieces of first packet registration information is registered; and activate, if the packet from the first network is the registered packet, a signal line corresponding to the one of the pieces of first packet registration information for the registered packet among the plurality of signal lines; and
  - a packet restoration unit provided in the second unit and having, as pieces of second packet registration information preliminarily registered therein for each of the specific packets, partial main packets excluding variable packets in the specific packets, the packet restoration unit being configured to: generate, in response to one of the plurality of signal lines being activated, a restored packet equivalent to the packet received by the first unit based on one of the pieces of second packet registration information corresponding to the activated one of the plurality of signal lines; and deliver the restored packet to the second network, wherein the packet determination unit: has pieces of first variable packet registration information preliminarily registered therein for each of the variable packets in each of the specific packets, each of the pieces of first variable packet registration information indicating that the one or more variable packet signal lines are active or inactive; and is configured to activate or inactivate the one or more variable packet signal lines when activating the signal line among the plurality of signal lines based on the packet, in accordance with one of the pieces of first variable packet registration information corresponding to one of the variable packets within the packet, and the packet restoration unit: has pieces of second variable packet registration information preliminarily registered therein, the pieces of second variable packet registration information being equivalent to the pieces of first variable packet registration information; is configured to identify one of the pieces of second variable packet registration information depending on a state where the one or more variable packet signal lines are activated or inactivated when generating the restored packet; and is configured to deliver, to the second network, one of the variable packets corresponding to the one of the pieces of second variable packet registration information, as a restored variable packet equivalent to the one of the variable packets within the packet received by the first unit.

5. The data diode device with specific packet relay function according to claim 4, wherein
the first unit comprises a first communication unit configured to receive a packet from a first network apparatus on the first network and transmit a packet received through the unidirectional transmission path to the first network apparatus, the packet determination unit comprises:
- a first storage unit configured to preliminarily store: a first reference table in which each of the pieces of first packet registration information including partial application data excluding the variable packets is registered so as to correspond to one of the plurality of signal lines; and a first variable packet reference table in which the pieces of first variable packet registration information are registered for each of the variable packets; and
- a first control unit, wherein if the partial application data in the packet received from the first network excluding the variable packets is included in one of the pieces of first packet registration information registered in the first reference table, the first control unit is configured to activate the signal line corresponding to the one of the pieces of first packet registration information among the plurality of signal lines, and identify one of the pieces of first variable packet registration information corresponding to one of the variable packets in application data from the first variable packet reference table to activate or inactivate the one or more variable packet signal lines in accordance with the identified one of the pieces of first variable packet registration information.

6. The data diode device with specific packet relay function according to claim 4, wherein the second unit comprises a second communication unit configured to: deliver the restored packet to the second network; receive a packet from a second network apparatus on the second network; and send the received packet to the first unit through the unidirectional transmission path, the packet restoration unit comprises:

a second storage unit configured to preliminarily store: a second reference table in which the pieces of second packet registration information are registered so as to associate pieces of partial application data excluding the variable packets with the plurality of signal lines for the pieces of first packet registration information; and a second variable packet reference table in which the pieces of second variable packet registration information are registered such that activeness or inactiveness of the one or more variable packet signal lines matches the pieces of first variable packet registration information for each of the variable packets; and a second control unit configured to: generate the restored packet including application data excluding the variable packets based on the one of the pieces of second packet registration information corresponding to the activated one of the plurality of signal lines; and generate the restored variable packet from the one of the pieces of second variable packet registration information corresponding to the activated or inactivated one or more variable packet signal lines.

7. A method for configuring the data diode device with specific packet relay function according to claim 3, the method comprising:

a first forming step of loading setting configuration information onto each of the first and second programmable logic devices and forming a communication wiring in each of the first and second programmable logic devices to validate a packet transmission path for sending a packet from the first network to the second network, and to form, on at least one of the first and second programmable logic devices, an information acquisition unit for acquiring, from the packet on the packet transmission path, packet registration information including source information, destination information, and application data;

a transmitting step of transmitting a specific packet authorized to be relayed from the first network apparatus toward the second network apparatus;

an information acquiring step of acquiring, by the information acquisition unit, the packet registration information from the packet transmitted at the transmitting step;

an information registering step of registering the packet registration information acquired at the information acquiring step as first and second packet registration information in the first and second reference tables so as to correspond to one of the plurality of signal lines; and a second forming step of, after the information registering step, loading first normal configuration information onto the first programmable logic device to form at least the first control unit on the first programmable logic device, thereby configuring the first unit, and loading second normal configuration information onto the second programmable logic device to form at least the second control unit on the second programmable logic device, thereby configuring the second unit.

8. The method for configuring the data diode device with specific packet relay function according to claim 7, wherein the first forming step includes forming the information acquisition unit on one of the first and second programmable logic devices, and the information acquiring step comprises:

a first information registering step of storing the packet registration information acquired by the information acquisition unit in one of the first and second reference tables; and a second information registering step of copying contents of the one of the first and second reference tables onto the other of the first and second reference tables.

* * * * *